(12) United States Patent
Summerfield et al.

(10) Patent No.: US 6,312,528 B1
(45) Date of Patent: Nov. 6, 2001

(54) REMOVAL OF CONTAMINANTS FROM MATERIALS

(75) Inventors: John W. Summerfield, Rosemount, MN (US); John P. Markiewicz, Andover; John M. Moses, Dedham, both of MA (US); Randall L. Barcus, Ham Lake, MN (US)

(73) Assignee: CRI Recycling Service, Inc., St. Paul, MN (US)

( * ) Notice: Subject to any disclaimer, the term of this patent is extended or adjusted under 35 U.S.C. 154(b) by 0 days.

(21) Appl. No.: 09/031,901

(22) Filed: Feb. 27, 1998

Related U.S. Application Data
(60) Provisional application No. 60/041,393, filed on Mar. 6, 1997.

(51) Int. Cl.[7] .................................................. B08B 7/00
(52) U.S. Cl. ................................ 134/40; 134/11; 134/10; 134/12; 134/31
(58) Field of Search ........................... 134/19, 10, 104.2, 134/104.4, 105, 107, 109, 12, 40, 1, 11, 17, 31; 68/18 R, 18 D, 19; 210/634

(56) References Cited

U.S. PATENT DOCUMENTS

| | | |
|---|---|---|
| 1,802,533 | 3/1931 | Reid . |
| 2,548,434 | 4/1951 | Leaders . |
| 2,560,935 | 7/1951 | Dickinson . |
| 3,436,262 * | 4/1969 | Crowe et al. ........................ 134/10 |
| 3,919,076 | 11/1975 | Cutler et al. . |
| 4,026,795 | 5/1977 | Okamoto et al. . |
| 4,061,566 * | 12/1977 | Modell . |
| 4,424,081 | 1/1984 | Giguere . |
| 4,434,028 | 2/1984 | Eppig et al. . |
| 4,460,292 | 7/1984 | Durham et al. . |
| 4,574,013 | 3/1986 | Peterson . |
| 4,611,950 | 9/1986 | Russomano . |
| 4,662,948 | 5/1987 | Weitzman . |
| 4,678,558 | 7/1987 | Belluteau et al. . |
| 4,765,257 | 8/1988 | Abrishamian et al. . |
| 4,770,780 | 9/1988 | Moses . |
| 4,770,862 | 9/1988 | Chu et al. . |
| 4,848,918 | 7/1989 | Kingsley et al. . |
| 4,849,027 * | 7/1989 | Simmons ........................ 134/22.18 |
| 4,877,530 | 10/1989 | Moses . |
| 4,919,570 | 4/1990 | Payne . |
| 4,996,317 | 2/1991 | O'Brien et al. . |
| 5,013,366 | 5/1991 | Jackson et al. . |
| 5,054,506 | 10/1991 | Shakeri . |
| 5,055,196 | 10/1991 | Darian et al. . |
| 5,073,203 | 12/1991 | Al-Ghatta . |
| 5,172,709 | 12/1992 | Eckhardt et al. . |
| 5,232,476 * | 8/1993 | Grant ........................................ 55/42 |
| 5,238,575 | 8/1993 | Waldmann . |
| 5,267,455 | 12/1993 | Dewees et al. . |
| 5,279,615 | 1/1994 | Mitchell et al. . |

(List continued on next page.)

OTHER PUBLICATIONS

John Markiewicz, CF Systems Corporation, "Extraction of Coal Tar–Derived Sludged With Liquefied Propane" 1990 Ironmaking Conference Proceedings pp. 183–188.

Richard de Fillippi et al. "Propane extraction treats refinery wastes to BDAT standards", Oil & Gas Journal, Sep. 9, 1991, pp. 52–54.

*Primary Examiner*—Alexander Markoff
(74) *Attorney, Agent, or Firm*—Patterson, Thuente, Skaar & Christensen, P.A.; Peter S. Dardi

(57) ABSTRACT

An improved approach for cleaning and recycling materials is based on pressurized solvents including liquid propane, butane, dimethyl ether, and supercritical carbon dioxide. The approaches are particularly suitable for cleaning sorbent materials. The approach allows for recycling of the sorbent materials, the solvent and the contaminents, typically oils and the like.

11 Claims, 13 Drawing Sheets

U.S. PATENT DOCUMENTS

| | | |
|---|---|---|
| 5,281,732 | 1/1994 | Franke . |
| 5,295,761 | 3/1994 | Heacock et al. . |
| 5,304,253 * | 4/1994 | Grant ................................. 134/26 |
| 5,340,406 | 8/1994 | Fearon . |
| 5,340,467 | 8/1994 | Gregoli et al. . |
| 5,344,493 | 9/1994 | Jackson . |
| 5,346,534 * | 9/1994 | Grant ................................. 95/39 |
| 5,355,901 | 10/1994 | Mielnik et al. . |
| 5,360,067 | 11/1994 | Meo, III . |
| 5,378,834 | 1/1995 | Koerts et al. . |
| 5,393,451 | 2/1995 | Koetzle . |
| 5,395,451 | 3/1995 | Triculis . |
| 5,399,204 | 3/1995 | Campo et al. . |
| 5,399,350 | 3/1995 | Potter . |
| 5,399,369 | 3/1995 | Singer . |
| 5,401,321 | 3/1995 | Hugo et al. . |
| 5,401,322 * | 3/1995 | Marshall ............................ 134/13 |
| 5,411,596 | 5/1995 | Pennaz . |
| 5,412,958 | 5/1995 | Iliff et al. . |
| 5,413,129 | 5/1995 | Shenoi . |
| 5,413,716 | 5/1995 | Osborne . |
| 5,415,812 | 5/1995 | Durbut et al. . |
| 5,417,768 | 5/1995 | Smith, Jr. et al. . |
| 5,422,019 | 6/1995 | Carman . |
| 5,458,198 | 10/1995 | Hashemi et al. . |
| 5,467,492 | 11/1995 | Chao et al. . |
| 5,470,508 | 11/1995 | Narayanan et al. . |
| 5,476,975 | 12/1995 | Ruddick et al. . |
| 5,482,211 | 1/1996 | Chao et al. . |
| 5,482,564 | 1/1996 | Douglas et al. . |
| 5,492,139 | 2/1996 | Lashmett et al. . |
| 5,492,881 | 2/1996 | Diamond . |
| 5,494,526 | 2/1996 | Paranjpe . |
| 5,505,219 | 4/1996 | Lansberry et al. . |
| 5,509,431 | 4/1996 | Smith, Jr. et al. . |
| 5,510,310 | 4/1996 | Manning . |
| 5,514,220 | 5/1996 | Wetmore et al. . |
| 5,514,286 | 5/1996 | Crosby . |
| 5,519,947 | 5/1996 | Paré . |
| 5,526,834 | 6/1996 | Mielnik et al. . |
| 5,533,538 * | 7/1996 | Marshall ............................ 134/104.4 |
| 5,543,057 | 8/1996 | Whiting et al. . |
| 5,556,548 | 9/1996 | Mellen . |
| 5,561,066 | 10/1996 | Sinha . |
| 5,589,004 | 12/1996 | Lashmett et al. . |
| 5,696,307 * | 12/1997 | Van Der Puy et al. ............. 570/134 |
| 5,711,820 * | 1/1998 | Smith et al. ......................... 134/12 |
| 5,938,927 * | 8/1999 | Reich et al. ........................ 210/634 |
| 5,962,390 * | 10/1999 | Flynn et al. ........................ 510/386 |

* cited by examiner

US 6,312,528 B1

REMOVAL OF CONTAMINANTS FROM MATERIALS

CROSS REFERENCE TO RELATED MATERIALS

This application claims priority to provisional application Ser. No. 60/041,393, filed on Mar. 6, 1997.

FIELD OF THE INVENTION

The present invention relates to an approach for removing contaminants from sorbent materials, commonly used to absorb oils, solvents and other lubricating products which have been leaked or spilled. The invention utilizes liquefied gas(es), and/or supercritical fluids, and optionally, traditional cosolvents and/or traditional or nontraditional surfactants to clean the sorbent materials such that they may be reused or disposed of in an economical and environmentally friendly fashion. The invention relates to removal of liquids from solids generally using dimethyl ether. Also, the invention relates to solvent recovery approaches.

BACKGROUND OF THE INVENTION

Granular absorbent materials include, for example, clay, fullers, and diatomaceous earth in compositions which have been processed, i.e., dried or sintered and crushed to the proper size. These granular absorbents are commonly used in garages, industrial facilities and other areas to absorb products such as oil, gasoline and other contaminants that have leaked or spilled. In a typical application of granular sorbent material, after the spill of a product occurs, the granular sorbent material is sprinkled over the spill and the user waits for a short period of time to allow the granular sorbent material to absorb the contaminating product. After the granular sorbent material has been allowed to absorb the contaminant, the granular sorbent material with the contaminant is swept into a pile and put into a barrel or other receptacle for storage. Thereafter, the facility, which uses the granular sorbent material, would have prior arrangements with a used granular sorbent material disposal service. This disposal service picks up the used granular sorbent material and treats it or disposes of it in a number of ways.

Two primary methods have been used for disposing of used granular sorbent material. The first disposal method is incineration. This method presents environmental problems such as potentially harmful air emissions and the necessity to landfill processed residuals (ash).

Another common practice for disposing of soiled granular sorbent material is to bury the used material in landfills. This is obviously an undesirable method because there is the potential for the contamination of groundwater, soil, etc. when burying petroleum-based or other products.

An alternative method of cleaning granular sorbent material involves exposing the granular sorbent material to genetically altered microbes that consume a contaminant. The purchasing, storage and use of microbes generally are not economically feasible for small shops. In addition, there is the problem of disposing of the used microbes, and individual equipment used to store the microbes can often be expensive.

Sorbent mats and pads also are used to absorb contaminants in commercial or industrial sites. The sorbent mats and pads can be cotton, polypropylene, polyethylene, or other fabrics. These sorbent mats and pads are used similarly to granular sorbent materials. After the sorbent mat or pad has absorbed the spilled products, it can be placed in a barrel for storage. The used sorbent disposal service treats the sorbent mats and pads at a laundry service, or by incineration, or by landfilling the material. The problem associated with the laundry service is that many of the contaminants are flushed into the sewer system and end up at waste water treatment plants.

SUMMARY OF THE INVENTION

The present invention generally involves a method and apparatus for cleaning granular sorbent material and absorbent mats and pads. In particular, liquefied gas(es), and/or supercritical fluids are used to remove contaminating products and other waste materials from used granular sorbent materials and sorbent mats, pads, booms, and the like.

The present invention utilizes a system wherein used granular sorbent material or sorbent mats or pads, which have absorbed synthetic oils, silicon oils and/or petroleum based products, are exposed to a liquefied gas such as dimethyl ether, propane, isobutane, butane, or a supercritical fluid such as supercritical carbon dioxide. This process removes contaminants such as petroleum oils, machining oils, hydraulic fluids, placticizers, fats, waxes, silicone oils, flux residues, soil and/or other lubricants.

The preferred apparatus envisioned for the present invention is a batch system, wherein the granular sorbent material or sorbent mats and pads are placed in a pressure vessel. The vessel generally is capable of holding a pressure between 25 and 5000 PSIG (pounds per square inch gauge) such that a selected solvent or solvents can exist in a liquefied, supercritical, or near critical state. The vessel temperature depending on the solvent used, preferably ranges from about 70°–140° F. For dimethyl ether, the preferred temperatures are about room temperature, and the preferred pressures are about 100 PSIG. For propane, the preferred temperatures are about room temperature or above, and the preferred pressures are about 150 PSIG or above. For supercritical carbon dioxide, the preferred temperatures are about 30°–40° C., and the preferred pressures are about 2000–4000 PSIG. The used granular sorbent material or sorbent mats or pads are exposed to the liquefied gases and/or supercritical fluids. A flow of solvent preferably is applied to the extraction vessel. After exposure for approximately 30 minutes or more, the used sorbent material preferably has 80% or more of its contaminants removed.

A general method according to the invention involves the following steps:

(a) Used granular sorbent material or sorbent mats or pads are placed in an extraction vessel, which can be pressurized.

(b) The vessel is closed and a solvent such as dimethyl ether, propane, butane or carbon dioxide is pumped into the vessel, at a prescribed temperature and pressure such that the solvent can exist in a state which allows the solvent to interact with and cleanse the soiled material. The solvent is as a liquefied gas or supercritical fluid.

(c) A flow of purified solvent and/or re-circulated solvent is circulated through the extraction vessel and allowed to penetrate the granular sorbent material or sorbent mats or pads for a period of time. During this time the solvent dissolves the contaminants (oils, etc.) and removes them from the absorbent material and from the extraction vessel.

(d) The solvent is drained out of the vessel. Preferably, the majority of the solvent then is recovered. Then, solvent vapor is recovered through a compressor. Any residual solvent vapor remaining in the vessel can be purged using an inert gas and/or by venting the vessel to the atmosphere or to a flare.

(e) The granular sorbent material or sorbent mats or pads are then removed from the extraction vessel.

(f) A new batch of used granular sorbent material or sorbent mats or pads are then placed in the extraction vessel.

(g) The process is repeated.

Preferably, the contaminated solvent is distilled to recover the solvent and contaminants (especially oils). The recovered solvent can be reused as purified solvent in the cleaning process. The recovered oils and the like preferably are also reused, for example, as a low grade lube stock oil.

In particular, in a first aspect, the invention features a method of removing contaminants from highly porous material, the highly porous material in virgin form having an absorbency of at least about 25 percent by weight of the virgin porous material, the method comprising:

contacting the highly porous material in a pressure chamber with a pressurized solvent to form a solvent/contaminant mixture; and recovering the highly porous material substantially free of the contaminants, wherein the recovered highly porous material has at least about 70 percent by weight of the contaminants removed.

Some highly porous materials in virgin form have an absorbency greater than about 45 percent by weight of the virgin porous material. The highly porous material can comprise a granular material. Preferred granular materials have an average diameter from about 0.1 mm to about 2 cm. Other forms of the highly porous material can comprise absorbent articles selected from the group consisting of a mats, pads, rags and booms.

The method can further include agitating the solvent in the pressurized chamber. The agitation can be performed by bubbling gas through the pressure chamber, by propelling a mechanical agitator, or by applying sonic energy. The highly porous material can include a material selected from the group consisting of ball clay, common clay, shale, fire clay, Fuller's earth, kaolin, diatomaceous earth, montmorillonite, a natural fabric and a synthetic polymer. The recovered highly porous material preferably has an absorptive capacity of at least about 50 percent by volume relative to the corresponding virgin material. The recovered highly porous material preferably has at least 85 percent by weight of the contaminants removed. The contaminants can include lubricants, petroleum oils, machine oils, dielectric oils, silicone oils, reflux residues, adhesive residues, plasticizers, fatty materials, waxy materials, or combinations thereof. The solvent preferably comprises a pressurized fluid composition selected from the group consisting of carbon dioxide, propane, isobutane, butane, and dimethyl ether. The solvent can further include a surfactant. The method preferably further includes separating the contaminants from the solvent. The method also can further include:

heating the pressurized solvent/contaminant mixture to remove a first portion of the solvents from the pressurized solvent/contaminant mixture to produce a partially cleaned contaminant; and reducing the pressure of the partially cleaned contaminant to remove substantially all of the solvent from the contaminant.

In another aspect, the invention features a method of recovering a solvent from a pressurized solvent/contaminant mixture, the method comprising:

heating a contaminated pressurized solvent in a first vessel to remove a first portion of the solvent from the solvent/contaminant mixture to produce a partially cleaned contaminant;

reducing the pressure of the partially cleaned contaminant to remove substantially all of the solvent from the contaminant and volatile components of the contaminant to obtain a recovered contaminant substantially free of volatiles; and separating the volatile components of the contaminant from the solvent.

The partially cleaned contaminant can be transferred to a second vessel to remove substantially all of the solvent. The volatile components preferably are collected as a liquid in a separate vessel. The volatile components can include gasoline and other conventional solvents.

In another aspect, the invention features a method of removing contaminants from porous materials, the method comprising:

contacting a quantity of porous material in a pressurized chamber with a pressurized solvent to form a solvent/contaminant mixture that is removed from the pressurized chamber; and flowing the removed solvent/contaminant mixture through a cosolvent chamber with contaminated porous material to remove contaminants from said contaminated porous material.

The method preferably further includes flowing clean solvent through the cosolvent chamber after completing the flow of solvent/contaminant mixture through the cosolvent chamber. The pressurized chamber and the cosolvent chamber can be the same vessel.

In another aspect, the invention features an apparatus for removing organic materials from a porous material comprising:

a pressure chamber; and a conduit in fluid communication with an outflow of the pressure chamber and an inflow of a cosolvent chamber such that outflow of the pressure chamber can be circulated through the cosolvent chamber.

The conduit can include a surge tank such that the outflow can be stored for circulation in the cosolvent chamber. The pressure chamber and the cosolvent chamber can be the same vessel or different vessels.

In another aspect, the invention features a method of removing polar and nonpolar contaminants from an article, the method including contacting the contaminated article with pressurized dimethyl ether such that the article after completion of the contacting step has at least about 70 percent each of the polar contaminants and the nonpolar contaminants removed. The article after completion of the contacting step preferably has at least about 85 percent each of the polar contaminants and the nonpolar contaminants removed.

In another aspect, the invention features a method of separating dimethyl ether from polar and nonpolar contaminants, the method comprising:

heating the contaminated dimethyl ether in a first vessel to remove a first portion of the solvent from the dimethyl ether/contaminant mixture to produce a partially cleaned contaminant;

reducing the pressure of the partially cleaned contaminant to remove substantially all of the dimethyl ether from the contaminant; and decanting the polar component of the contaminant from the nonpolar component of the contaminant.

In another aspect, the invention features a method of cleaning sorbent articles comprising applying sonic energy to agitate a pressurized solvent in contact with the sorbent article in a pressurized vessel, the pressurized solvent comprising a surfactant.

Additional features and advantages are evident from the detailed description and claims below.

DESCRIPTION OF THE PREFERRED EMBODIMENTS

Figure 1:
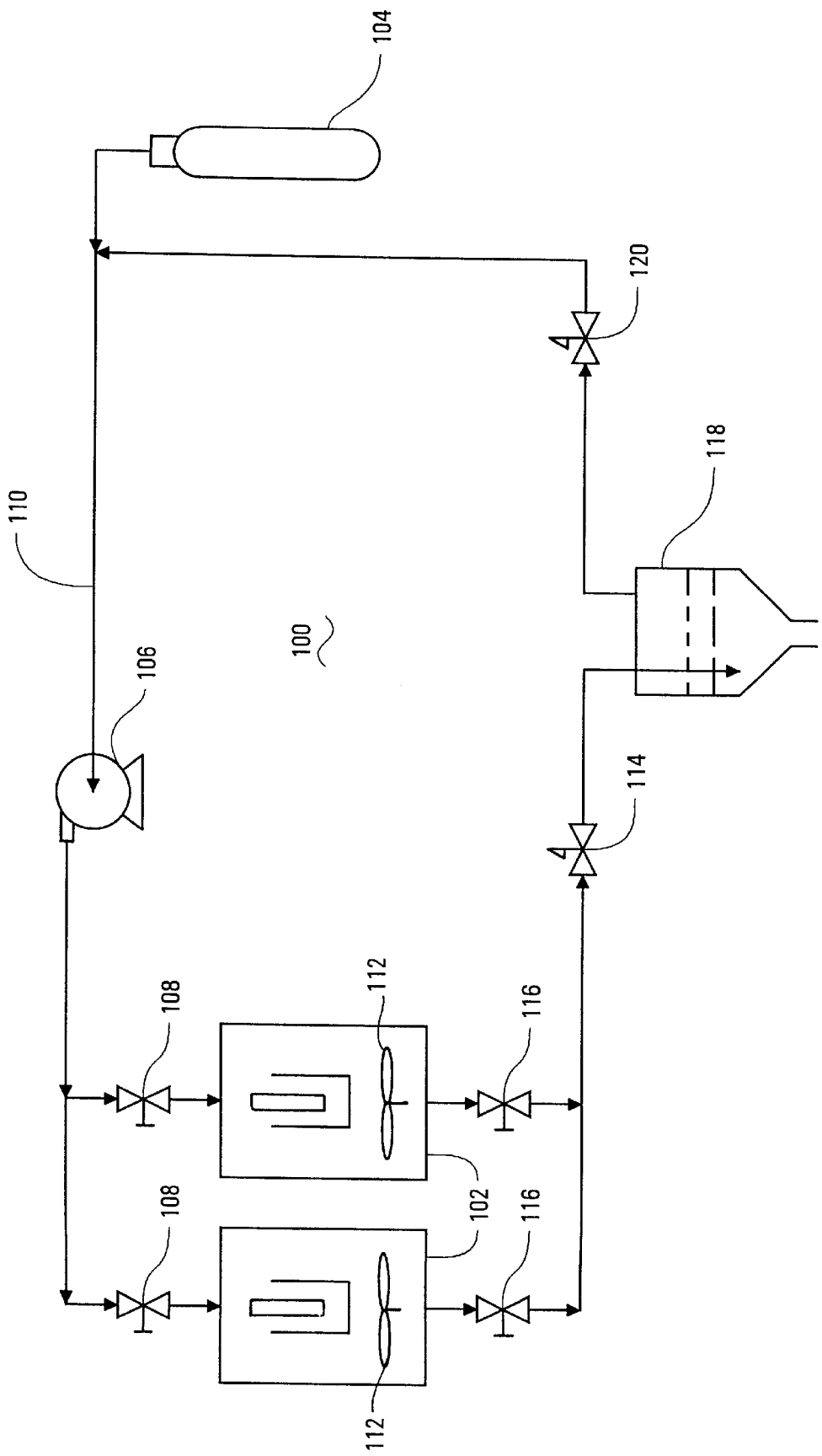
FIG. 1 is a schematic layout of an apparatus useful for removing contaminants from sorbent materials.

The present invention utilizes pressurized solvents to remove contaminants from granular sorbent material and sorbent mats and pads (hereinafter "soiled material"). The invention preferably utilizes a batch-type apparatus wherein the soiled material is introduced into the apparatus and cleaned. The solvent is separated from the contaminating material such that the solvent and preferably the contaminant can be reused.

Suitable sorbent materials can be clay or non-clay sorbent mineral products, or natural or synthetic organic sorbent materials. Suitable sorbents can be granular sorbents or sorbent articles. Preferred sorbents have an absorbancy of 25 percent or more by weight more preferably 35 percent or more by weight and even more preferably 40 percent or more by weight relative to the weight of the virgin material.

Preferred granular sorbent materials include, for example, processed absorbent clay material. Typical granular sorbents include ball clay, common clay, shale, fire clay, Fuller's earth, kaolin, diatomaceous earth or montmorillonite. Clay and related materials generally are heated to form a durable sorbent material. Processed diatomaceous earth and Fuller's earth have good sorbent properties and, thus, are particularly useful as granular sorbent material and also perform well within our cleaning process. Fuller's earth is clay or a clay-like material that is typically high in magnesia. The crystalline structure of Fuller's earth makes it suitable as an industrial process sorbent for applications such as absorbing oil and gas. Typically, the clay is mined in Florida or Georgia. Diatomaceous earth generally is mined in the Western United States and is a mineral. Granular sorbent material also may be a combination of different absorbing materials.

For the purposes of this invention, "granular sorbent material" is meant to include sorbent materials, made from any sorbent clay, or other sorbent non-clay materials which may absorb contaminants. Preferred granular materials have an average diameter from about 0.2 mm to about 2 cm and more preferably from about 1 mm to about 1 cm.

The present invention also can be used to clean oil and/or dirt from sorbent articles such as sorbent mats, pads, sorbent booms, or other cloth products. Sorbent mats, pads, rags, booms and the like are made generally from a natural and/or synthetic polymers. These sorbents can be made specifically from cotton, polyesters, polyethylene, polypropylene or other similar polymers.

In a typical application, granular sorbent material made of Fuller's earth or other absorbent type materials will be sprinkled on the floor to absorb materials such as petroleum oils, machine oils, dielectric oils, lubricants, silicone oils, flux residues, adhesive residues, hydraulic fluids, antifreeze, transmission fluids, placticizers, and other fatty and waxy materials. The purpose of applying the granular sorbent material is to not only absorb any spilled contaminating product, but to minimize the chances of an individual slipping on the oily material. Application of granular sorbent material also eases clean up, and typically the user does not have to use rags or mops unless it is necessary to get the floor absolutely clean. After a spill of oil or other contaminants, the user sprinkles granular sorbent material onto the spill, allows the granular sorbent material to absorb the spill, and thereafter sweeps up the material and disposes of it.

Alternatively, sorbent articles such as mats, pads, rags and the like can be used to clean up the contaminants. Similarly, sorbent booms can be used to contain and clean up the contaminants. The user can select between granular absorbents and sorbent articles depending on the particular use and preference.

In general, the cleaning process involves the removal of contaminants from batches of sorbent materials. A particular batch is sealed within a pressure vessel at the start of the process. The solvent is then placed in the vessel. Preferably, the solvent flows through the pressure vessel for a significant portion, if not all, of the cleaning or extraction time. In preferred embodiments, a solvent/contaminant mixture is formed and is circulated through a pressure vessel to extract contaminants from additional materials. Use of a solvent/ contaminant mixture as a "solvent" reduces the total amount of solvent needed and actually results in a more efficient removal of contaminants in a given period of time. If solvent/contaminant mixture is circulated through a pressure vessel, the process preferably includes the flow of non-contaminated solvent through the pressure vessel after completion of the circulation of the solvent/contaminant mixture.

Once use of a portion of solvent is complete, the solvent preferably is diverted for recovery. In particular, the solvent can be separated from the contaminants and recycled. The separation is made possible by the selection of a solvent that has a low boiling point at atmospheric pressure. The separation of contaminants from the solvent preferably involves two or more steps. In the first step, the temperature is increased under pressure comparable to the pressure used for the cleaning process to distill the solvent from the contaminant/solvent mixture. In the second step, any remaining solvent is removed by distilling the residual contaminant/solvent mixture at reduced pressures, preferably 2–100 PSIG depending on the solvent.

Solvent

Oils preferably are miscible with the solvent, and the solvent preferably has a relatively low enthalpy of vaporization along with a relatively low boiling point. The solvent should be effective at solvating oils and other hydrocarbons since these are common contaminants. In reviewing the four different solvents which were used in the Examples below, we found that the carbon dioxide was less efficient in removing the hydrocarbons from the granular sorbent material than the other solvents used. This is because the solubility of the hydrocarbons in the carbon dioxide was approximately 1% whereas in propane the hydrocarbons were soluble up to a level of approximately 15%.

The solubility effects two major processing parameters, residence time and volume of solvent used (solvent to feed ratio). Residence time and solvent to feed ratio are interrelated. As the solubility decreases, the volume of solvent must increase if the residence time is to remain relatively constant. If the volume of solvent increases beyond reasonable levels, it may no longer be practical to operate and recycle the solvent from the contaminant and any cosolvent (s). It is important both economically and environmentally to recycle the solvent that is used.

The enthalpy of vaporization and enthalpy of condensation also plays a significant role in solvent selection. Preferably, the solvent used would have an enthalpy of vaporization at 25° C. of less than 30 KJ/mole, more preferably less than 25 KJ/mole. The enthalpy of vaporization is the heat added to one mole of liquid at its boiling point to convert it to vapor with no change in temperature. If the enthalpy of vaporization is too high for a solvent, it becomes less energy efficient to recover the solvent. It may be useful also to take specific heat into consideration when selecting a preferred solvent.

Enthalpies of vaporization can be estimated according to Trouton's law:

$$\Delta H \text{ valorization}/T = \Delta S \text{ vaporization}$$

In other words, the enthalpy of vaporization divided by the boiling point is equal to the entropy of vaporization; which is approximately the same for all liquids. With only a few exceptions, the entropies of vaporization are around 90 J/K(mole) for most liquids. This relationship correlates the enthalpy of vaporization to boiling point, and thus an increased boiling point correlates to an increased enthalpy of vaporization.

A low boiling point is also a desirable characteristic for the solvent. A low boiling point provides easier separation and recycling of the solvent from the contaminants and also from any cosolvents, which may be used in the process. Preferred solvents are gases at atmospheric pressure and room temperature.

With these characteristics in mind, preferred solvents solubilize the oils and other contaminants, and/or are miscible with a cosolvent that dissolves the oils and other contaminants. These solubility properties along with a low boiling point and a low enthalpy of vaporization are characteristics of preferred solvents.

Preferred solvents include, for example, lower molecular weight carbon compounds with 1–5 carbon atoms, although ammonia and derivatives thereof can be used. Preferred solvents include, for example, hydrocarbons and hydrocarbons substituted with halogen, oxygen, nitrogen, or other atoms. Particularly, preferred solvents include, for example, dimethyl ether, propane, carbon dioxide, butane, and isobutane. These particularly preferred solvents are generally "inexpensive" and fall within the preferred performance guidelines. Dimethyl ether is an especially preferred solvent for the removal of polar and non-polar contaminants. Common polar contaminants include, for example, water, glycols, and alcohols. Common non-polar contaminants include, for example, petroleum products.

Furthermore, the solvent used in the extraction process should be fairly unreactive with respect to both the porous material and potential contaminants. This is important when dealing with waste materials since they may contain small amounts of reactive materials.

Cosolvents can be used for a variety of reasons and can be selected based on the types of contaminants that are to be removed. Again, it is important to choose a cosolvent which is generally unreactive with respect to common contaminants. Suitable cosolvents include both other liquefied gases and/or traditional liquid solvents. Preferred cosolvents include acetone, toluene, hexane, methanol, ethanol, liquefied gases and mixtures thereof. Generally, polar cosolvents would be used to remove polar contaminants and non-polar cosolvents would be used to remove non-polar contaminants. The cosolvent should be miscible in the solvent that is being used. Cosolvents, when used, generally are included in a quantity of about 0.1 to about 50% by weight of the solvent and more preferably from about 0.5% to about 10%.

Since particular cosolvents can be more effective at removing certain types of contaminants, it may be useful to select the cosolvent based on the particular contaminants on the sorbent materials from a particular customer. We can target the removal of specific types of contaminants with a particular cosolvent. The higher molecular weight hydrocarbons would be removed efficiently by hexane while light oils would be removed efficiently by propane. Mixtures of cosolvents have proven to be effective in removing various hydrocarbons.

Once the solvent has passed through the contaminated porous material, the dissolved contaminants can act as a cosolvent. Thus, the solvent/contaminant mixture preferably is circulated through a vessel to remove further contaminants. Circulating this mixture of "used" solvent can reduce extraction times and solvent volume by improving the removal of the contaminants which are more difficult to remove such as the "dirts" and higher molecular weight materials. Also, use of the mixture reduces the amount of solvent that needs to be recovered.

The solvents can also be mixed with surfactants. The surfactants that can be used vary greatly. These surfactants could be used along with the solvent and/or could be added to a cosolvent and then this mixture could be added gradually to the solvent. Surfactants are generally used at a much lower volume than the cosolvents. Surfactants are generally not used at levels above about 2–4% by weight of the solvent and typically are used at levels of about 1% or less. The surfactants used in conjunction with most of the preferred solvents would form reverse micelles. Surfactants in particular assist with removing certain types of contaminants including high molecular weight organic and inorganic compounds.

Suitable surfactants can be selected form the large number of known surfactants. Preferred surfactants for use with propane solvent include, for example, butyl cellosolve (2-butoxy ethanol), sodium bis(2-ethyl hexyl)sulfosuccinate and didodecyl-dimethyl ammonium bromide.

Apparatus and Process Description

A first embodiment of a suitable apparatus to perform the cleaning operation is displayed schematically in FIG. 1. The soiled sorbent is placed in a mesh basket and is lowered into pressurized extraction vessel 102 from the gtop. Preferably, the basket is large enough to hold the contents of a 55 gallon drum, such that a single 55 gallon volume of soiled sorbent or more may be processed in a single batch operation. Vessel 102 is then sealed, and the pressure and, optionally, temperature are raised. If, for example, supercritical $CO_2$ is being used as the solvent, the pressure preferably would be above 1,078 psi, and the temperature preferably would be at or above 31.14° C.

Apparatus 100 includes a supply 104 of solvent. The solvent is directed through a pump 106 and through a valve 108 into pressurized extraction vessel 102. The pressures in flow line 110 preferably are above 1 atmosphere. The pressure of solvent leaving pump 106 preferably is elevated to begin preparing the fluid for entry into the vessel 102. As the solvent is pumped from pump 106 into vessel 102, it passes through valve 108, which is preferably a pressure type of valve. A plurality of extraction vessels 102 may be arranged in parallel, as shown in FIG. 1. An agitator 112 optionally can be used to agitate the solvent within vessel 102.

Pressure regulator 114 regulates the pressure of the solvent along with the contaminants leaving vessels 102 through valves 116. The contaminants are thereafter removed utilizing solvent recovery system 118. Recovered solvent is returned to supply 104 through pressure regulator 120. The various components can be made from standard materials that are inert and can withstand the range of pressures and temperatures to which they are subjected. Preferred materials include, for example, stainless steel.

Figure 2:
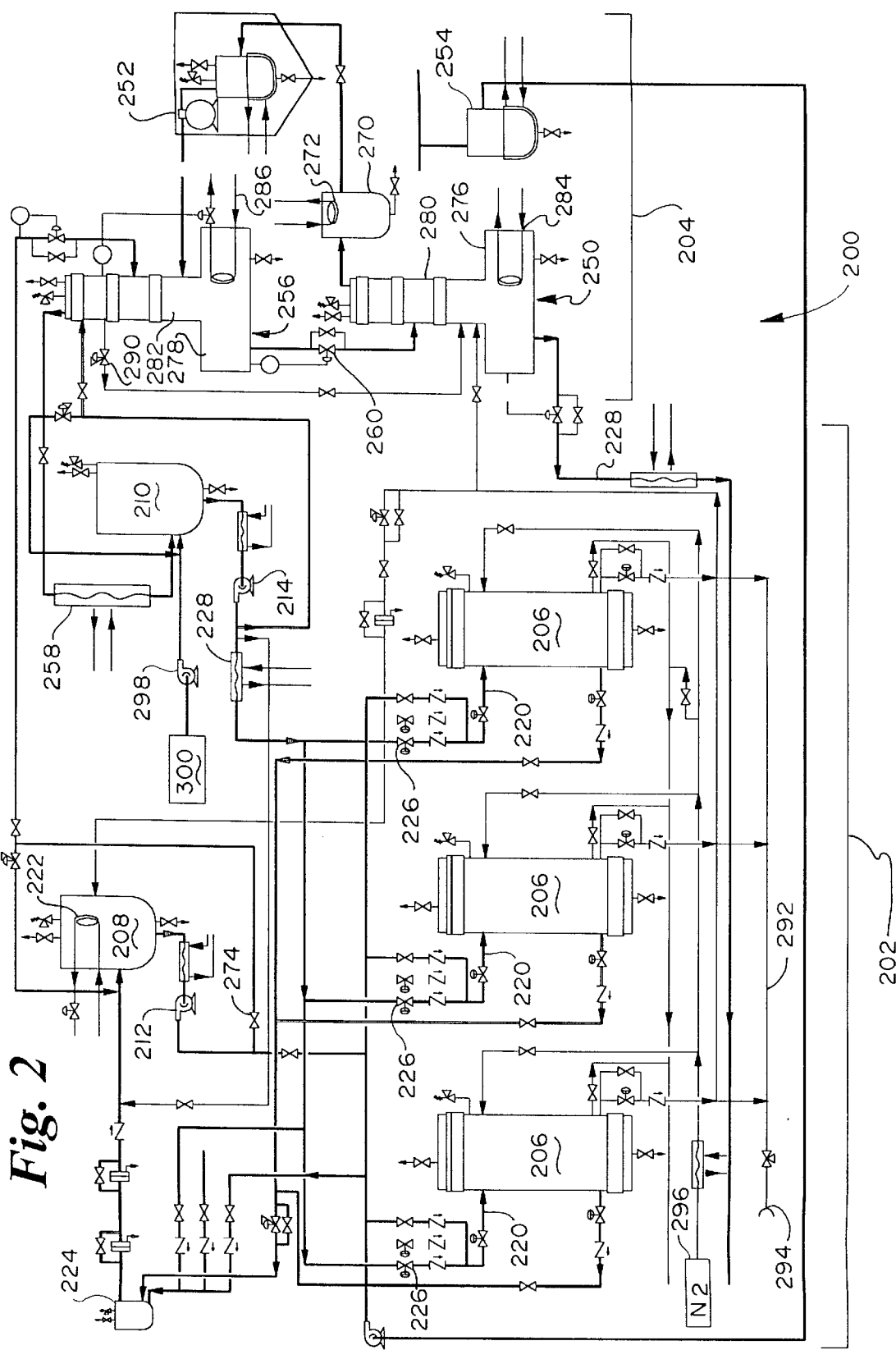
FIG. 2 is a schematic layout of a preferred embodiment of an apparatus of the invention.

A second embodiment of the apparatus 200 is shown in FIG. 2. The apparatus 200 can be divided into two primary sections based on function, an extraction system 202 and a solvent recovery system 204. The apparatus yields at least two products, contaminant such as oil free of solvent and cleaned sorbent material free from the bulk of the contaminants. A preferred apparatus also separates volatile components of the contaminents from less volatile components of the contaminents. In this way, oils can be obtained that have suitable properties for reuse or burning.

While a preferred extraction system 202 is shown in FIG. 2 with three extractors, a plant could be built with only one extractor or with as many as desired. For a production facility, preferred extraction vessels preferably would have each a nominal capacity of a 55 gallon drum of granular sorbent and more preferably two 55 gallon drums or more. The solvent recovery system 204 preferably operates on a continuous basis, separating the extracted oil from the solvent and circulating the solvent back to the extractors.

Extraction System

Referring to FIG. 2, a preferred extraction system 202 of apparatus 200, suitable for propane, dimethyl ether or other solvents with similar boiling points, is comprised of the following major pieces of equipment:

1. Vessels 206 are extraction vessels. The extraction involving contaminated sorbent material is accomplished within these vessels. Multiple vessels can be connected in series or in parallel.

2. Tank 208 is an extract surge tank. Tank 208 is a receiving vessel for extract (solvent plus extracted oils) from extraction vessels 206. Tank 208 can supply used solvent to the extractors during a recirculation phase of the extraction process.

3. Tank 210 is a solvent holding tank. Solvent holding tank 210 receives clean, condensed solvent from the solvent recovery system 204. Solvent holding tank 210 acts as a supply vessel for extractor pumps when pure solvent is to be used for extraction.

4. Pumps 212 and 214 are used to introduce the solvent to extraction vessels 206 from the extract surge tank 208 and solvent holding tank 210, respectively. Pumps 212 and 214 are preferably centrifugal pumps, although other types of pumps can be used.

Extractions generally are performed on a batch basis. The extraction system preferably contains three extraction vessels; two of which are on-line, while the third is being unloaded/loaded. Two drums of used granular sorbent material weighing approximately 400 pounds each is loaded into one of the extractor baskets. The basket with the used sorbent is then loaded into the extraction vessel 206. Once this is complete, the vessel is sealed and purged of air using nitrogen.

Then, the extraction vessel 206 is filled with liquid solvent form surge tank 208 through the solvent inlet port 220 at the top of the vessel with pump 212. The flow of solvent is maintained at the prescribed rate with a flow controller 226. Cosolvents and/or surfactants can be introduced by way of mixing tank 224.

The extract leaving the extraction vessels flows to extract surge tank 208. Tank 208 is equipped with heat exchanger 222 in its vapor space. Heat exchanger 222 assures the vapor pressure in tank 208 is lower than the vapor pressure in the extraction vessel so that liquid in the extraction vessel 206 can drain into tank 208. The first stage of the optional extraction cycle involves recirculating solvent and preferably lasts from about 1 minute to about 30 minutes, and more preferably from about 3 minutes to about 25 minutes. Alternatively, the extraction vessels can be attached in series to accomplish the equivalent of recirculation.

The extraction vessel 206 then is filled with clean solvent from tank 210 using pump 214. This clean solvent enters at the same port 220 used during the first (recirculation) stage of extraction. The flow rate of solvent into the extraction vessel(s) is controlled by a flow controller 226. The temperature of the solvent is maintained at a suitable temperature by regulating the hot water flow through heat exchanger 228. The solvent extract after passing through the extraction vessel 206 flows to extract surge tank 208. This second stage of the timed extraction involving the flow of clean solvent preferably lasts for about an additional 1 minute to about 30 minutes and more preferably from about 3 minutes to about 25 minutes.

At the completion of the extraction cycle, extractor pump 214 is stopped and the residual liquid extract in the extraction vessel 206 is allowed to drain to extract surge tank 208 by the pressure differential. When the draining is completed, the extraction vessel 206 will contain the cleaned granular sorbent material and solvent vapor. To depressurize the extraction vessel 206 the vapor is directed to a second separator 250. When the pressure in the extraction vessel 206 reaches about 5 PSIG, vapor flow to separator 250 is stopped. The remaining solvent vapor in the extraction vessel is purged to a vent header 260 with nitrogen. The extraction vessel 206 then can be opened to recover the treated sorbent solids.

One complete cycle preferably is expected to take about 60 minutes to complete: about 40 minutes for the extraction, and about an additional 20 minutes to perform the loading, pressurization, depressurization, and unloading activities. While two extractors are in a 40 minute extraction cycle, the operator can be preparing a third extractor for operation. In this manner, on average three complete cycles can be completed per hour resulting in a throughput of 2400 pounds per hour based on 110 gallon extraction vessels.

Solvent Recovery

In the solvent recovery system 204 of apparatus 200, the extracted oils are separated from the solvent, which then can be recycled for reuse in the extraction process. Solvent recovery system 204 can operate continuously and independently of extraction system 202. Solvent recovery system 204 generally is comprised of the following major pieces of equipment.

1. Primary separator 256 is a pressurized distillation column with a re-boiler which vaporizes solvent from extracted oils. Reflux in separator 256 purifies solvent.

2. Condenser 258 removes heat from solvent vapor leaving separator 256 liquefying the solvent for storage in tank 210.

3. Secondary separator 250 is a lower pressure distillation column and re-boiler used to recover residual solvent from the extracted oil. Remaining contaminants (oil) from primary separator 256 flow into secondary separator 250 through pressure valve 260. It is also used as the inlet surge vessel to scavenger compressor 252.

4. Vessel 270 is the volatile compound (VOC) knock-out. The heat exchanger 272 will condense any of the VOC such as gasoline. The VOCs will be collected in vessel 270 and will be periodically drained.

5. Compressor 252 is a scavenger compressor. Scavenger compressor 252 is used to scavenge residual solvent vapor from extraction vessels 206 and secondary separator 250.

As described above, extract (solvent containing the dissolved contaminants) flows into the extract surge tank 208. Tank 208 serves as the supply vessel for the primary separator 256. Solvent containing extracted contaminants is fed, via pump 212 and valve 274, from the bottom of tank 208 into primary separator 256.

Separators 250, 256 consist of a horizontal re-boiler 276, 278 and a vertical column 280, 282 where the vaporized solvent flows out to scavenger compressor 252 and condenser 258. Vaporization of the solvent in re-boilers 276, 278 is accomplished using hot water (or oil) flowing through tubes 284, 286 at the side of the bundle while the solvent contaminant mixture boils. The solvent, having a low boiling point relative to the dissolved contaminants, is vaporized and flows from the top of vertical column 280 to the condenser 258 and from the top of vertical column 280 to volatile compound knock-out 270. Condensed, distilled solvent then flows to storage tank 210 where it is stored until solvent is required in the extraction end of the plant.

The partially recovered contaminants are periodically bled from the bottom of primary separator 256 through a temperature controlled valve 260 into secondary separator 250. Secondary separator 250 supplies additional heat via heat exchanger 284 to the partially recovered contaminants (e.g., oil) so than any residual solvent can be recovered. Vapor solvent from the top of secondary separator 250 flows to the inlet of the scavenger compressor 252. After removal of the solvent, the contaminants are drained from the bottom of secondary separator 250 by way of drain 288 into a product drum. When no solvent vapor is being generated by either secondary separator 250 or extraction vessels 206, a slip-stream of solvent vapor is taken from the distillation column 282 of primary separator and fed to secondary separator 250 through a pressure regulator 290. Thus, scavenger compressor 252 can operate continuously.

Preferably, substantially all of the solvent is removed from the contaminant product, such that the contaminant product can be recycled or incinerated. Preferably, the recovered contaminant contains less than about 1 percent by weight solvent, more preferably less than about 0.5 percent solvent and even more preferably less than about 0.25 percent solvent. Similarly, substantially all volatile components of said contaminant product is removed from the residual contaminant product. Volatile components, such as gasoline, have a significant vapor pressure at room temperature and atmospheric pressure. Preferably, the volatile compounds removed from the contaminents include compounds with boiling points below 165° C., and more preferably below 210° C. Volatile compounds with flash points between 10° C. and 70° C. are preferably removed. Preferably, the recovered contaminant contains less than about 1 percent by weight volatile components, more preferably less than about 0.5 percent by weight volatile components, and even more preferably less than about 0.25 percent by weight volatile components. Recovered motor oil preferably has a flash point greater than 142° F. such that it would not be classified as a hazardous material. More preferably, recovered motor oil has a flash point greater than about 145° F. Generally, recovered motor oil will have a flash point between about 145° and about 165° F.

For very low boiling solvents such as carbon dioxide, the elevated pressures needed suggest certain modifications. For example, pump 212 and vessel 208 preferably would be eliminated. The extractors preferably would be operated in series with the extract flowing directly into the solvent recovery system 204. Solvent recovery system 204 preferably would comprise flash drums rather than conventional distillation columns. The heat of compression could be used to drive the flash drums in a vapor recompression cycle.

With solvents having boiling points near or just below room temperature at atmospheric pressure, modifications preferably would be made to the solvent recovery system 204. Since butane has a lower vapor pressure at a specific temperature than propane or dimethyl ether, more energy would be required to recover the solvent. A stripping section preferably would be added to assist with removing residual solvent. The stripping section has a stripper with a packed column. Liquid flows across the packing while a gas flows up through the liquid stripping out volatile components.

Additional Equipment

Additional elements that are noted in FIG. 2 include the heating and cooling systems, solvent make-up, and the venting, purging, and pressure relief safety system.

The heat required to perform the extraction at elevated temperatures and to drive the distillation process can be provided by a hot water (or oil) system. This system generally consists of a boiler and a pump for fluid transfer, which circulates hot water to the required heat exchangers.

Cooling is provided to the condenser, and other heat exchangers by, for example, a chilled water and glycol system.

All pressure vessels are connected to a common relief header 254 by means of individual pressure relief valves or rupture discs. Header 254 in turn flows to a knockout drum, which preferably is piped to a flare.

At the bottom of FIG. 2, a flow out 292 of the system is depicted in fluid communication with a vent header 294. Additionally, there is a nitrogen feed 296 into the system. Other inert gases can be substituted for the nitrogen. Pump 298 is used for feeding make-up solvent into the system from solvent source 300.

Solvent losses occur because some solvent is not recovered. When solvent in the surge tank 210 reaches a predetermined reduced level, liquefied solvent is pumped into surge tank 210 from solvent source 300. In addition, solvent is introduced into the system to initiate the process when the system is brought on line.

When performing the extraction, there are at least five variables that can be varied. These five variables are pressure, temperature, solvent to feed ratio, residence time and linear velocity. One preferred commercial application for apparatus 200 provides for cleaning 120 gallon quantities of soiled granular sorbent material or sorbent mats or pads per hour per extraction vessel. Extraction vessels can be arranged in series or in parallel. Larger diameter vessels needs thicker walls; the required thickness depends on the pressure to be used. If supercritical $CO_2$ is used as a solvent, this requires a pressure range of approximately 1050–5000 PSIG, a temperature range of approximately 32–50° C., and a residence time of approximately 40 minutes. Generally, appropriate processing parameters are selected according to the solvent used. Preferred values for specific solvents are presented in the Examples. It is anticipated that the batch process, which involves placing the used granular sorbent material in the extraction vessel, bringing the extraction vessel up to sufficient pressure and temperature, circulating new, or re-circulating solvent and then bringing the pressure down, preferably involves approximately 30–40 minutes. Thus, a total residence time of about one hour per batch is anticipated. A continual flow of the cleaning solvent need not be a requirement. In fact, no flow or a very low flow of the cleaning solvent may be advantageous, especially when using cosolvents or surfactants.

There are numerous factors which enable this process to uniquely affect the cleaning and recycling of used sorbent materials. The extraction process is particularly effective in removing petroleum based contaminants from highly porous granular materials in part because of the void volume of granular sorbent materials. This void volume allows the flow of solvent to contact most if not all of the surface areas of the granular sorbent substrate. The material does not "pack" inside the vessel, and there generally is little if any pressure differential from one end of the vessel to the other. The free flow of solvent through the vessel is evidenced when the flow rate is increased while maintaining a minimal pressure differential between the top and bottom of the vessel. This minimal pressure differential is also obtainable with the more porous mats and pads.

Methods of Agitation

Generally, agitation is used when cleaning mats, pads and the like. Agitation may damage some granular sorbent materials. For example, a variety of approaches can be used for agitating the solvent within the extraction vessel, when desired. U.S. Pat. No. 5,467,492 discloses a method and apparatus for cleaning garments by agitating the garments by "boiling" the carbon dioxide. Similar "boiling" of other pressurized solvents can be used.

Preferably, agitation can be performed by bubbling gas into the bottom of the vessel while the solvent remains at a pressure and temperature away from its boiling point. The bubbling gas would have the physical property of boiling well above the boiling point of the liquid gas solvent at that pressure and temperature.

For example, if propane is used as the solvent, nitrogen gas can be used as the bubbling gas. The extraction vessel at ambient temperature can be held at a pressure between about 300 and about 500 PSIG, well above the boiling point of propane at 150 PSIG and well below the boiling point of carbon dioxide at 800 PSIG.

Thus, at ambient temperature and the selected pressure, the propane is a liquid and the $CO_2$ is a gas. The $CO_2$ would be bubbled in from the bottom and be allowed to vent off at the top of the extraction vessel. This method has the advantage of maintaining the solvent at a liquid phase with its corresponding solubility properties. The other advantage is that there are no additional mechanical moving parts added to the extraction vessel.

An alternative agitation system which could be used in the present apparatus would be the use of ultrasonics or megasonics to aid in the removal of "dirt" and higher molecular weight material from the contaminated absorbent. Ultrasonics or megasonics would not be a good means of agitation for the granular absorbent material because the ultrasonics tend to break down the material. However, this is a good alternative for aiding in the cleaning of the mats, pads, rags and/or booms. Similarly, mechanical agitation with a stirring device can be used, if desired.

The present invention takes advantage of efficiencies resulting from the processing of a large volume of used granular sorbent material. The used granular sorbent material from garages, industrial sites, etc., generally is picked up and shipped to a central processing facility. The central processing facility would receive shipments of used granular sorbent material and sorbent mats and pads from whatever geographical ranges it can accommodate. The term "used granular sorbent material" is meant to include granular sorbent material with any type of undesirable contaminants contained within or on its surface. Contaminants can include, for example, petroleum oils, machining oils, dielectric oils, lubricants, adhesive residues, placticizers, flux residues, silicone oils, and other fatty and waxy materials. However, this is not an exhaustive list, and any type of liquid or semi-liquid material may be absorbed by granular sorbent material is envisioned for the present invention.

EXAMPLES

A series of bench-scale tests confirmed the effectiveness of using solvent extraction to remove oils, greases, waxes, and other petroleum based contaminants from used granular sorbent materials and sorbent mats and pads. The goal was to remove enough of the petroleum contaminants from the sorbent material to allow reuse of the sorbent product. The work plan for the bench-scale testing program called for testing different solvents (supercritical carbon dioxide and liquefied dimethyl ether, propane and butane). A pilot plant study was also performed, as described below.

Two apparatus were used for the bench-scale measurements described below. Apparatus 1 had three extractors with different dimensions. Extractor 1 was a stainless steel pressure vessel measuring approximately 7 cm in diameter and 3.2 cm long. This vessel had a capacity of about 80 grams of feed material. Extractor 2 was a stainless steel tube having an inside diameter of approximately 1 cm and a length of approximately 25 cm. Extractor 2 held about 10 grams of sample and was generally put in series after one of the other extractors. Placing extractor 2 in series indicated if maximum solubility was being attained. If additional oil was extracted from the second extractor, then, saturation was not reached in the first extractor in series. Extractor 3 was a 50-cm long stainless steel pipe having an inside diameter of approximately 3-cm. Typically, about 300 grams of sample could be tested in Ext 3. Using Extractor 1 and/or Extractor 2, the progress of an extraction could be monitored at intermediate points by depressurizing the extractor and weighing the vessel and contents. Extractor 3 was too heavy to monitor intermediate points with the analytical balance. The three extractors had maximum operating pressure ratings in excess of 3500 PSIG.

Sample sizes for the bench-scale measurements ranged from about 10 grams to about 300 grams of contaminated sorbent feed. The tests were performed with batch type extractors, which were opened, loaded and secured for each test.

Additional experimental work was performed with apparatus 2. Apparatus 2 had a micro-flow meter, which monitored the flow of the solvent both as an instantaneous value and also as a total flow of solvent. The stainless steel extraction vessel used with apparatus 2 had a diameter of 3.175 cm, a cross section of about 7.92 cm$^2$ and a length of about 30 cm. Solvent flowed from the top of the extraction vessel to the bottom.

Solvent extraction was tested on the two bench-scale apparatus for the separation of oils and greases from granular sorbent material. The objective was to produce treated solids that contained less than about 15% by weight contaminants and preferably 2% or less contaminants from a feed content of about 30–50% by weight contaminants. Dimethyl ether, propane, butane and supercritical carbon dioxide were all successfully tested in these evaluations. Other parameters that were varied in the test program included: operating temperature and pressure, solvent flow rate, solvent to feed ratio, contact time (residence time), solvent linear velocity, extractor geometry, flow direction, number of stages, and cosolvents.

The following examples illustrate the efficiency of the present invention, and provide some guidance with respect to effects of adjusting various parameters. For many of the experimental measurements, one of three different types of contaminated sorbents was used. Waste sample 1 was prepared to provide a particularly difficult cleaning task. Waste sample 1 was a fullers earth clay contaminated with multiple contaminants. The contaminents in waste sample 1 are given in Table 1.

TABLE 1

Composition of Waste Sample 1

| Component | Volume Added (mls) | Volumetric Percentage (g/ml) | Density of Substance (g/ml) | Weight of Substance Added (g) | Weight Percentage of Total |
|---|---|---|---|---|---|
| Stoddard solvent | 120 | 2.0% | 0.812 | 97.44 | 1.83% |
| Antifreeze | 120 | 2.0% | 1.125 | 135.00 | 2.53% |
| Hydraulic oil | 120 | 2.0% | 0.903 | 108.36 | 2.03% |
| Gear grease | 120 | 2.0% | 0.876 | 105.12 | 1.97% |
| Autokut 250 Sulfur based oil | 120 | 2.0% | 0.931 | 111.72 | 2.09% |
| Emulsiplex Water soluble oil | 1:10 (oil:water) | 2.0% | 0.994 | 119.28 | 2.23% |
| Gear Shield Extra heavy gear grease | 120 | 2.0% | 1.006 | 120.72 | 2.26% |
| Used Motor Oil | 5160 | 86.0% | 0.880 | 4540.8 | 85.06% |
| Total | | 100% | | 5338.44 | 100% |

The contaminants listed in Table 1 were added to 4.0 gallons of virgin Fullers earth clay sorbent, Oil-Dri™ (Oil-Dri Corporation of America, Ill.) and mixed thoroughly. The mixture had about a 33% by weight hydrocarbon content. Waste sample 2 was a fullers earth clay and used motor oil obtained from a gas station. Waste sample 2 was about 70% by weight fullers earth clay and about 30% by weight used motor oil. Waste sample 3 was prepared with Eagle-Picher™ diatomaceous earth. Used motor oil (Amoco Ultimate Gold® 5W-30 from a car after about 3000–5000 miles of driving) was added to produce a mixture that was 50% by weight used motor oil. When mixing the granular sorbent with the contaminants a homogenous mixture was not always obtained as some of the fluids would migrate to the bottom of the stock sample. Additional sample waste materials are described below.

Sorbent cleanliness can be measured by one of the three following approaches. Generally, the results from the three approaches are similar.

Sorbent Cleaned %—This number represents the percentage of hydrocarbons that remain on the contaminated sorbent material after processing. Three different approaches were used to obtain the Sorbent Cleaned %.

A. Soxhlet Method—This method was used to calculate the Sorbent Cleaned % for the samples that were run on apparatus 2. Soxhlet extraction involves the continuous reflux of a suitable solvent over a sample for hours to exhaustively extract contaminants from the sample matrix. This method used processed sorbent material weights and post soxhlet extraction weights to calculate cleaned %. The following is a sample calculation:

Weight of Processed Sorbent Material=47.9 g

Weight of Processed Sorbent Material After Soxhlet Extraction=47.0 g

Calculated % Clean=47.0/47.9=98.1%

B. Weight Method—This method was used to calculate the Sorbent Cleaned % for selected samples. This method assumes that the sorbent control sample was contaminated with oil to a level of approximately 31% by weight. This was based on use of Waste Sample 1 with adjustment for a portion of contaminants not being absorbed by the granular sorbents. A calculation can then be performed of the % clean according to the method used in the following sample calculation:

Sample Weight Before Processing=67.7 g

Assume 31% oil: Therefore, Oil=20.9 g
Clay=46.8 g

Extracted Oil=19.8 g

Oil Remaining on Sorbent=20.9−19.8=1.1 g

Sorbent & Oil Combined Weight=46.8+1.1=47.9 g

Calculated % Clean=46.8/47.9=97.7%

C. %Clean Pace—Independent analysis of the sorbent clean % was obtained for a portion of the samples that were run. The independent testing lab (Pace Analytical, Minneapolis, Minn.) used a soxhlet extraction with methylene chloride or freon solvent.

Example 1

Supercritical Carbon Dioxide

Results obtained in Example 1 were based on cleaning in apparatus 1 using waste sample 1. The extraction parameters relating to these runs are summarized in Table 2.

Figure 3:
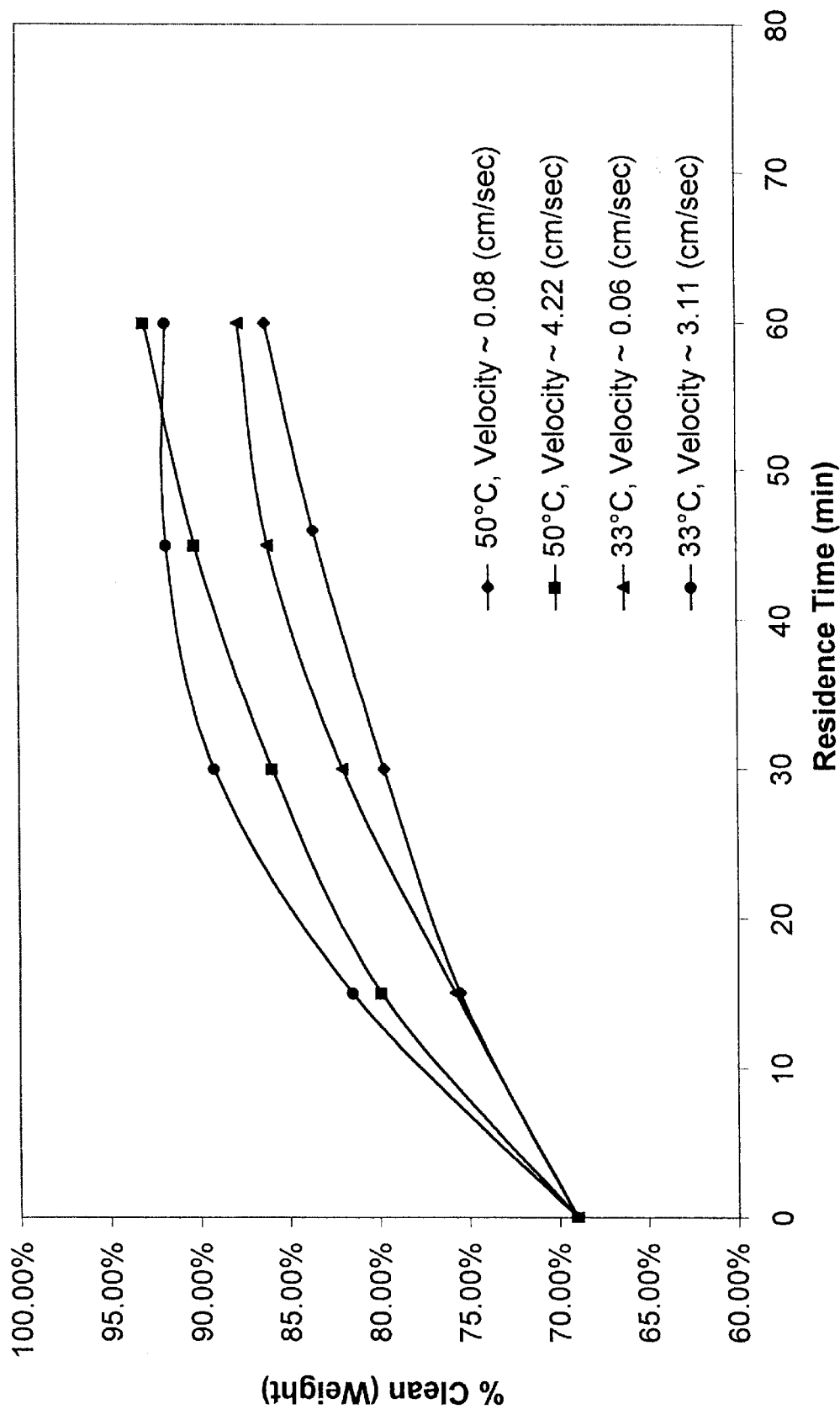
FIG. 3 is a graph relating percent clean to residence time for four separate runs at different temperatures and solvent velocities while holding pressure (in the extraction vessel) constant.

Carbon Dioxide Cleaning. Pressure @ 2500 PSIG and Varied Velocities and Temperatures Referring to FIG. 3, an increase in solvent velocity increases the removal of the hydrocarbons significantly. Increasing the flow rate increased the amount of solvent flowing through the extractor for a given residence time.

As can be seen, there were smaller cleaning differences between the results obtained with similar velocities and different temperatures than there were obtained with the same temperature and different velocities. Although this conclusion has some degree of uncertainty because of the varying velocities in the measurements, lower temperatures (still above the critical temperature) appeared more effective in removing the hydrocarbons at a given velocity. This conclusion is consistent with available data in carbon dioxide solubility tables. Table 3 (runs 1–4) presents corresponding data indicating the cleaning obtained with different run times.

Figure 4:
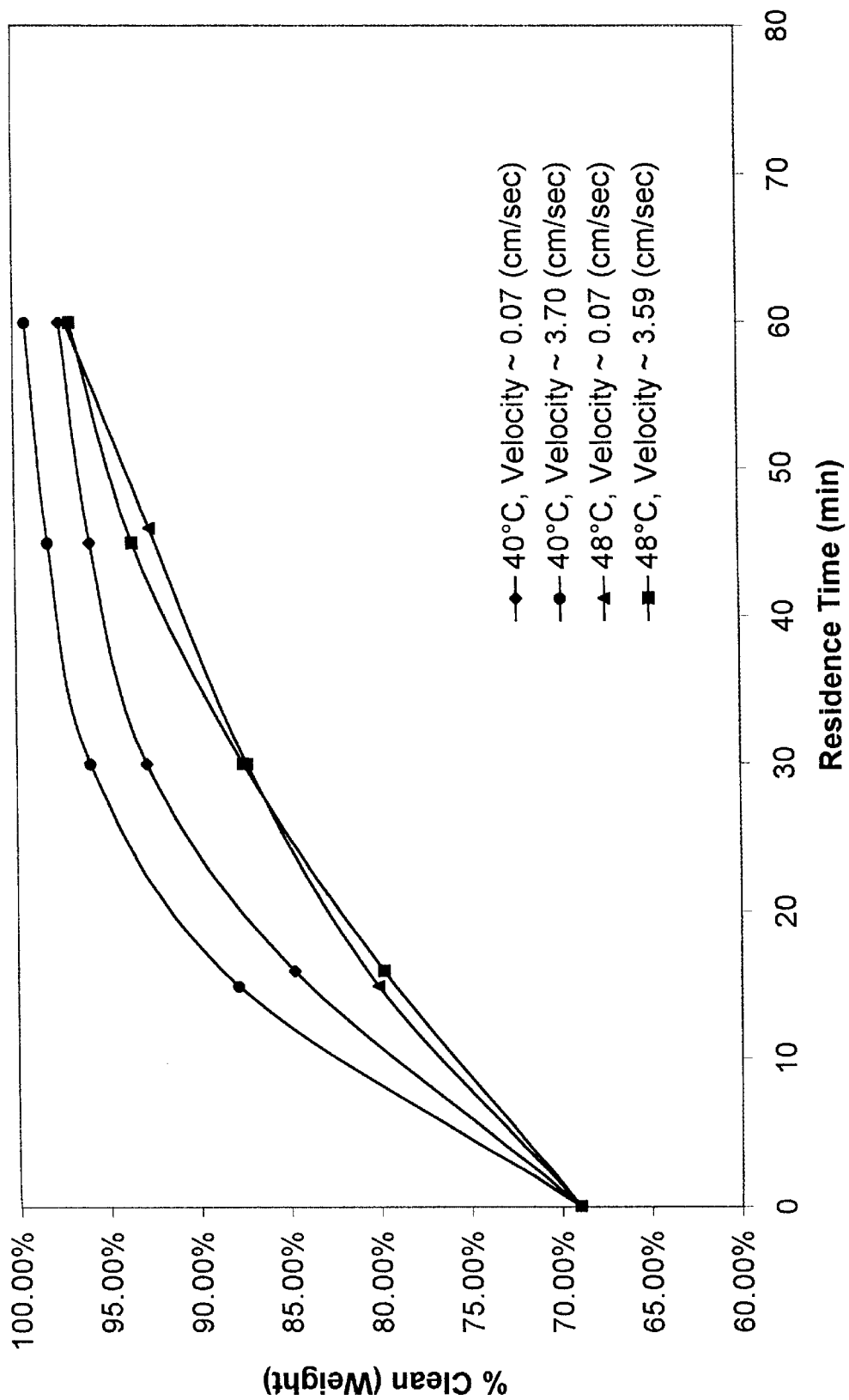
FIG. 4 is a graph relating percent clean to residence time for four separate runs at different solvent velocities (in the extraction vessel) while holding pressure constant. Temperatures are also varied between some of the runs.

Carbon Dioxide Cleaning. Pressure @ 3500 PSIG with Different Temperatures and Velocities Referring to FIG. 4, at 40° C., velocity appeared to have less of an effect at this higher pressure when compared to the runs done at 2500 PSIG. Furthermore, the differences in cleaning effectiveness between runs at different velocities decreased as the residence time increased beyond 30 minutes. This decreasing difference was not seen in the different velocity runs at 2500 PSIG.

At 48° C. and 3500 PSIG, there is little or no difference in the effectiveness of removal of the hydrocarbons between the two different velocity runs. Again, the lower temperature runs were more effective for removing the hydrocarbons from the clay sorbent material. Table 3 (runs 5–8) presents data indicating the cleaning obtained with different run times.

Figure 5:
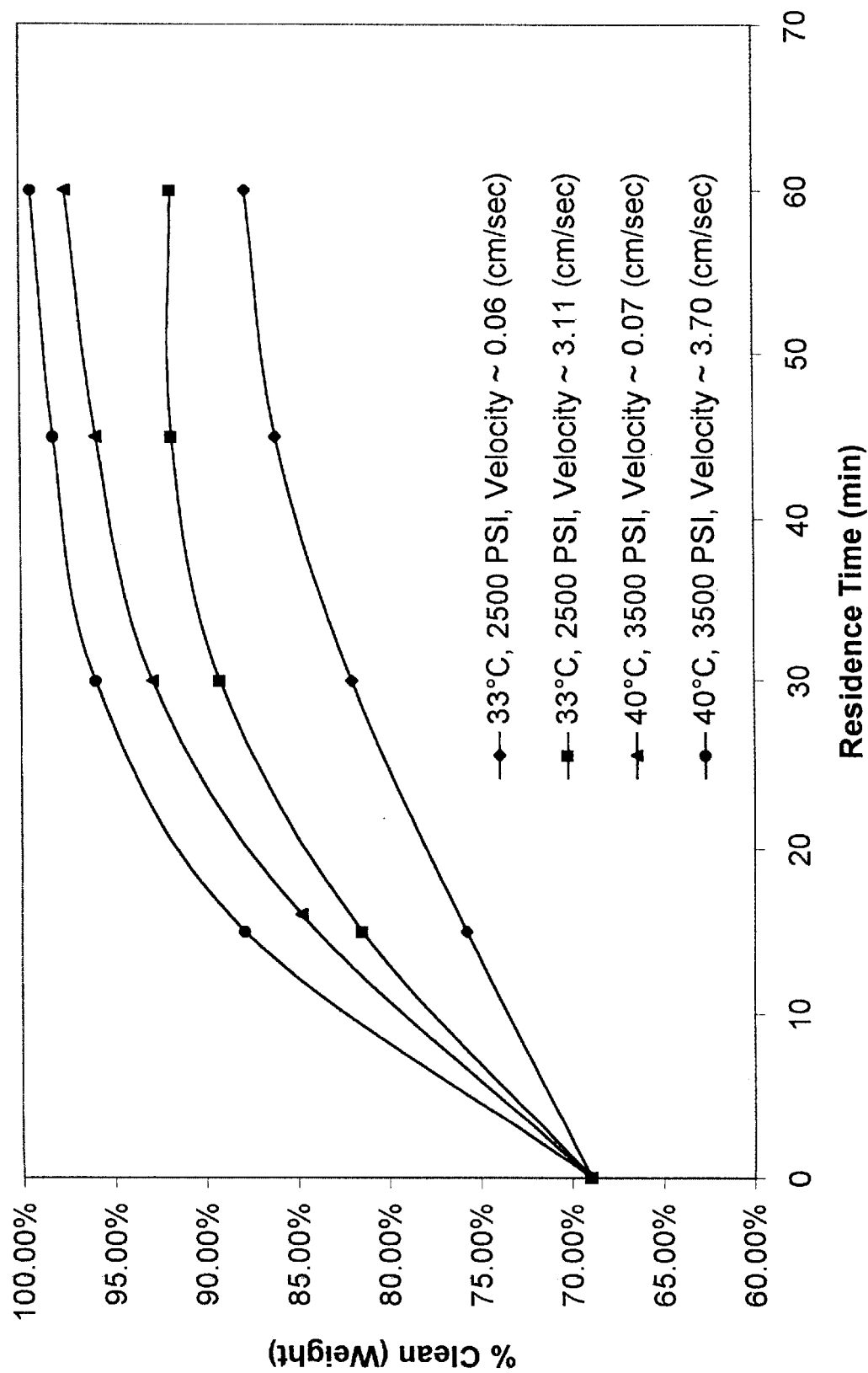
FIG. 5 is a graph relating percent clean to residence time for four separate runs at different pressures, solvent velocities (in the extraction vessel) and vessel temperatures.

FIG. 5 displays results at 2500 PSIG and 3500 PSIG. The high pressure runs were more effective for fixed residence time in removing the hydrocarbons from the clay sorbent material. This may be due to the fact the solubility increases considerably with increasing pressure from 2500 PSIG to 3500 PSIG.

Additional runs performed with supercritical carbon dioxide are summarized in Tables 2 and 3.

TABLE 2

Parameters for Cleaning Waste Sample 1 With Supercritical Carbon Dioxide

| Run # | Ave. Temp. (C. °) | Ave. Pressure (PSI) | Average Solvent Flow (ml/sec) | Average Linear Vel. (cm/sec) | Residence Time (min) | Flow Direction | % Clean (Weight) | % Clean (Pace) | Total Flow (ml) | Vessel Diameter (cm) | Vessel Area (cm2) |
|---|---|---|---|---|---|---|---|---|---|---|---|
| 1 | 50 | 2500 | 3.01 | 0.08 | 60 | Top to Bottom | 84.23% | | 10830 | 7.000 | 38.48 |
| 2 | 50 | 2500 | 3.01 | 4.22 | 60 | Bottom to Top | 90.78% | | 10830 | 0.953 | 0.71 |
| 3 | 33 | 2500 | 2.22 | 0.06 | 60 | Top to Bottom | 85.69% | | 7980 | 7.000 | 38.48 |
| 4 | 33 | 2500 | 2.22 | 3.11 | 60 | Bottom to Top | 89.65% | | 7980 | 0.953 | 0.71 |
| 5 | 40 | 3500 | 2.64 | 0.07 | 60 | Top to Bottom | 95.26% | 96.00% | 9500 | 7.000 | 38.48 |
| 6 | 40 | 3500 | 2.64 | 3.70 | 60 | Bottom to Top | 97.09% | 97.00% | 9500 | 0.953 | 0.71 |
| 7 | 48 | 3500 | 1.75 | 0.07 | 60 | Top to Bottom | 94.91% | | 9215 | 7.000 | 38.48 |
| 8 | 48 | 3500 | 1.75 | 3.59 | 60 | Bottom to Top | 94.68% | | 9215 | 0.953 | 0.71 |
| 9 | 42 | 3500 | 2.48 | 0.06 | 45 | Top to Bottom | 93.63% | 94.50% | 6650 | 7.000 | 38.48 |
| 10 | 42 | 3500 | 2.48 | 3.45 | 45 | Bottom to Top | 94.68% | 95.00% | 6650 | 0.953 | 0.71 |
| 11 | 25 | 3500 | 4.22 | 5.92 | 15 | Bottom to Top | 82.53% | | 3800 | 0.953 | 0.71 |
| 12 | <50 | 3450 | 3.41 | 0.43 | 79 | Bottom to Top | NA | 90.80% | 16150 | 3.175 | 7.92 |
| 13 | <50 | 3450 | 3.52 | 6.55 | 81 | Bottom to Top | 81.55% | 84.80% | 17100 | 0.953 | 0.71 |
| 14 | 38 | 3500 | 2.45 | 0.06 | 93 | Bottom to Top | 93.80% | 92.39% | 13680 | 7.000 | 38.48 |
| 15' | 38 | 3500 | 2.59 | 0.07 | 90 | Top to Bottom | 97.14% | 95.91% | 13966 | 7.000 | 38.48 |
| 16' | 38 | 3500 | 2.45 | 3.44 | 60 | Bottom to Top | 100.61% | 84.80% | 8836 | 0.953 | 3.44 |

'Cosolvent oil

TABLE 3

Supercritical Carbon Dioxide Solvent Cleaning as a Function of Residence Time

| Run # | Time (Min.) | Sample Wt | Accumulated Weight Loss | Remaining Oil (grams) | % Clean (Weight) | % Clean (Pace) |
|---|---|---|---|---|---|---|
| 1 | 0 | 87.1 | 0 | 28.39 | 67.40% | |
|   | 15 |  | 7.5 | 20.89 | 73.75% | |
|   | 30 |  | 11.7 | 16.69 | 77.86% | |
|   | 45 |  | 15.2 | 13.19 | 81.65% | |
|   | 60 |  | 17.4 | 10.99 | 84.23% | |
| 2 | 0 | 13.2 | 0 | 4.30 | 67.40% | |
|   | 15 |  | 1.8 | 2.50 | 78.04% | |
|   | 30 |  | 2.6 | 1.70 | 83.93% | |
|   | 45 |  | 3.1 | 1.20 | 88.09% | |
|   | 60 |  | 3.4 | 0.90 | 90.78% | |
| 3 | 0 | 89.5 | 0 | 29.18 | 67.40% | |
|   | 15 |  | 8 | 21.18 | 74.02% | |
|   | 30 |  | 14.2 | 14.98 | 80.11% | |
|   | 45 |  | 17.8 | 11.38 | 84.13% | |
|   | 60 |  | 19.1 | 10.08 | 85.69% | |
| 4 | 0 | 13.7 | 0 | 4.47 | 67.40% | |
|   | 15 |  | 2.1 | 2.37 | 79.60% | |
|   | 30 |  | 3.1 | 1.37 | 87.11% | |
|   | 45 |  | 3.4 | 1.07 | 89.65% | |
|   | 60 |  | 3.4 | 1.07 | 89.65% | |
| 5 | 0 | 67.7 | 0 | 22.07 | 67.40% | |
|   | 16 |  | 12.6 | 9.47 | 82.81% | |
|   | 30 |  | 17.4 | 4.67 | 90.72% | |
|   | 45 |  | 19 | 3.07 | 93.70% | |
|   | 60 |  | 19.8 | 2.27 | 95.26% | 96.00 |
| 6 | 0 | 12.1 | 0 | 3.94 | 67.40% | |
|   | 15 |  | 2.6 | 1.34 | 85.85% | |
|   | 30 |  | 3.4 | 0.54 | 93.74% | |
|   | 45 |  | 3.6 | 0.34 | 95.95% | |
|   | 60 |  | 3.7 | 0.24 | 97.09% | 97.00 |
| 7 | 0 | 69 | 0 | 22.494 | 67.40% | |
|   | 15 |  | 9.6 | 12.894 | 78.29% | |
|   | 30 |  | 14.5 | 7.994 | 85.33% | |
|   | 46 |  | 17.6 | 4.894 | 90.48% | |
|   | 60 |  | 20 | 2.494 | 94.91% | |
| 8 | 0 | 11.8 | 0 | 3.8468 | 67.40% | |
|   | 16 |  | 1.6 | 2.2468 | 77.97% | |
|   | 30 |  | 2.5 | 1.3468 | 85.52% | |
|   | 45 |  | 3.1 | 0.7468 | 91.42% | |
|   | 60 |  | 3.4 | 0.4468 | 94.68% | |
| 9 | 0 | 69.6 | 0 | 22.6896 | 67.40% | |
|   | 15 |  | 11.2 | 11.4896 | 80.33% | |
|   | 30 |  | 16.6 | 6.0896 | 88.51% | |
|   | 46 |  | 19.5 | 3.1896 | 93.63% | 94.50 |
| 10 | 0 | 11.8 | 0 | 3.8468 | 67.40% | |
|    | 15 |  | 2.1 | 1.7468 | 81.99% | |
|    | 30 |  | 2.9 | 0.9468 | 89.36% | |
|    | 45 |  | 3.4 | 0.4468 | 94.68% | 95.00 |
| 11 | 0 | 63.6 | 0 | 20.73 | 67.40% | |
|    | 30 |  | 4.8 | 15.93 | 72.90% | |
|    | 60 |  | 14.7 | 6.03 | 87.66% | |
|    | 75 |  | 18.7 | 2.03 | 95.47% | |
|    | 80 |  | 19.2 | 1.53 | 96.55% | |
|    | 93 |  | 17.9 | 2.83 | 93.80% | 92.39 |

Example 2

Propane Solvent

All of these runs in this example were performed with liquid propane as the solvent in the extraction process. Apparatus 1 was used with extraction vessel 3. The process variables explored in this example include:

Cosolvent Use

Solvent Velocity

Solvent Re-circulation

Residence Time

Pump Calibrations

The nominal volume of the pump used was 19.00 cc/stroke. This pump was calibrated by the means of filling any empty extraction vessel with propane while keeping count of the number of strokes the pump made during this filling. The vessel was weighed before and after. The weight difference was correlated back to volume of propane using its density at room temperature and thus the pump volume could then be back calculated. It was found that this pump would pump approximately 13 ml of propane per stroke.

It should also be noted that in running the experiments the strokes per second were measured and varied to some degree. In the beginning of a run, the used oils would saturate the propane, and this mixture was more viscous than pure propane. The flow of the extractor fluid was controlled by a needle valve at the down stream end of the extraction vessel. After the first 5–7 minutes of most runs, it was easier to maintain a consistent flow rate of the extraction fluid.

Calculations of Linear Velocity

Using the pump volume and the diameters of the extractor vessels, the linear velocity (nominal superficial velocity) was calculated. $V=Q/A$, where V is the linear velocity, Q is the flow rate and A is the cross section area of the extraction vessel. Flow rate can further be defined as volume of propane per unit time.

$Q = 12$ strokes/min. $\times 15$ cm$^3$/stroke $= 180$ cm$^3$/min.

Internal diameter of vessel $= 1.25$ inches $\times 2.54$ cm/inch $= 3.18$ cm.

$$A = \frac{\pi D^2}{4} = \frac{(3.14)(3.18)^2}{4} = 7.94 \text{ cm}^2$$

For a flow rate of 180 ml per minute, the linear velocity was $V = (180 \text{ cm}^3/\text{min.})/7.94 \text{ cm}^2 = 22.67$ cm/min.

$$V = 22.67 \text{ cm/min.} \times \frac{1 \text{ min.}}{60 \text{ sec.}} = 0.378 \text{ cm/sec}$$

Comparison of Propane vs. Carbon Dioxide

Figure 6:
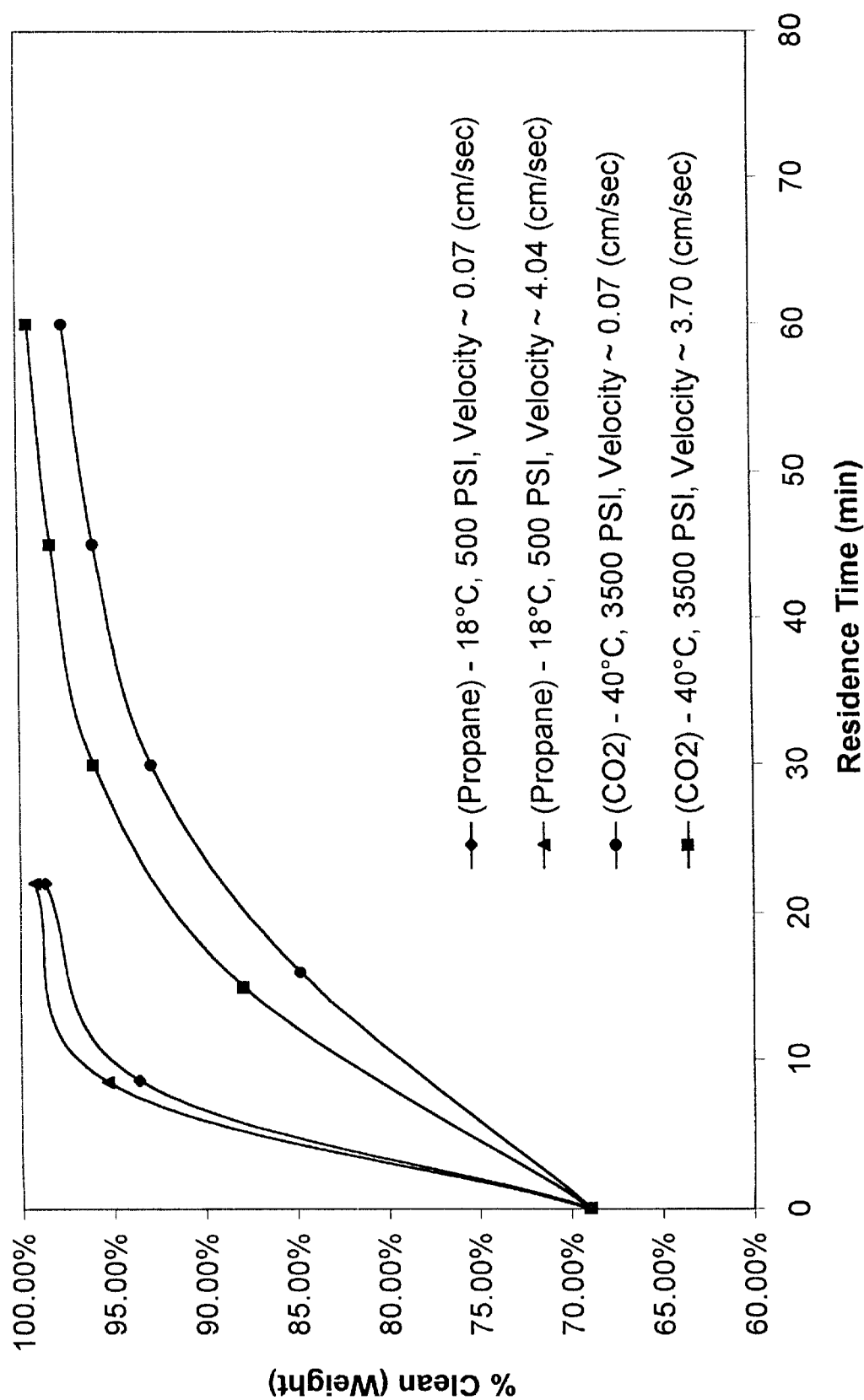
FIG. 6 is a graph relating percent clean to residence time for four separate runs. Two of the runs are propane runs and two are carbon dioxide runs.

Referring to FIG. 6, propane solvent was used at two solvent velocities. The propane solvent cleaned the granular clay sorbent material with shorter residence times than supercritical carbon dioxide to obtain a comparable level of cleaning. In particular, the propane solvent required less than half the residence time to reach 95% clean relative to the carbon dioxide solvent. The difference between the two different propane runs with varied velocities is much smaller than the difference between carbon dioxide runs with similar velocities. These results indicate that with propane solvent, the solvent to feed ratio can be much lower and the cleaning efficiency can be much higher, when compared to supercritical carbon dioxide solvent. The parameters for these runs are found in Table 4 along with some additional propane solvent runs. The percent clean as a function of run time for these propane runs is presented in Table 5.

TABLE 5

| Run # | Time (Min.) | Sample Wt | Accumulated Weight Loss | Remaining Oil (grams) | % Clean (Weight) | % Clean (Pace) |
|---|---|---|---|---|---|---|
| 1 | 0 | 71.5 | 0 | 23.31 | 67.40% | |
|   | 8.6 |  | 18.8 | 4.51 | 91.44% | |
|   | 22 |  | 21.5 | 1.81 | 96.38% | 97.95 |
| 2 | 0 | 10.5 | 0 | 3.42 | 67.40% | |

TABLE 5-continued

| Run # | Time (Min.) | Sample Wt | Accumulated Weight Loss | Remaining Oil (grams) | % Clean (Weight) | % Clean (Pace) |
|---|---|---|---|---|---|---|
| | 8.5 | | 2.9 | 0.52 | 93.12% | |
| | 22 | | 3.2 | 0.22 | 96.95% | 98.74 (a) |

TABLE 4

| Run # | Ave. Temp. (C. °) | Ave. Pressure (PSI) | Average Solvent Flow (ml/sec) | Average Linear Vel. (cm/sec) | Residence Time (min) | Flow Direction | % Clean (Weight) | % Clean (Pace) | Total Flow (ml) | Vessel Diameter (cm) | Vessel Area (cm2) |
|---|---|---|---|---|---|---|---|---|---|---|---|
| 1 | 20 | 500 | 2.88 | 0.07 | 22 | Top to Bottom | 96.38% | 97.95% | 3800 | 7.000 | 38.48 |
| 2 | 20 | 500 | 2.88 | 4.04 | 22 | Bottom to Top | 96.95% | 98.74% (a) | 3800 | 0.953 | 0.71 |
| 3 | 16 | 350 | 2.22 | | 40 | | | 99.05% | | | |
| 4 | 16 | 350 | 2.22 | | 40 | | | 99.11% | | | |
| 5 | 16 | 350 | 2.22 | | 40 | | | 97.19% | | | |
| 6 | 16 | 350 | 2.22 | | 40 | | | 98.98% | | | |

TABLE 6

| Run # | Waste Sample # | Cosolvent | Ave. Temp. (C. °) | Ave. Pressure (PSI) | Average Solvent Flow (ml/sec) | Average Linear Vel. (cm/sec) | Residence Time (min) | Flow Direction | % Clean (Soxhlet) | Total Flow (ml) | Vessel Diameter (cm) | Vessel Area (cm2) |
|---|---|---|---|---|---|---|---|---|---|---|---|---|
| 1 | 1 | none | 18 | 400 | 2.73 | 0.34 | 23 | | 94.90% | 3763.2 | 3.175 | 7.92 |
| 2 | 1 | none | 18 | 400 | 5.86 | 0.74 | 23 | bottom to top | 96.22% | 8089.6 | 3.175 | 7.92 |
| 3 | 1 | none | 18 | 400 | 13.4 | 1.69 | 23 | bottom to top | 96.05% | 18432 | 3.175 | 7.92 |
| 4 | 1 | none | 18 | 300 | 1.61 | 2.25 | 23 | bottom to top | 98.42% | 2215.68 | 0.953 | 0.71 |
| 5 | 1 | none | 18 | 310–300 | 2.85 | 3.99 | 23 | bottom to top | 98.82% | 3932.16 | 0.953 | 0.71 |
| 6 | 2 | none | 18 | 400 | 2.45 | 0.38 | 23 | | 95.72% | 3385.6 | 3.175 | 7.92 |
| 7 | 2 | none | 18 | 400 | 2.35 | 0.30 | 23 | | 95.91% | 3238.4 | 3.175 | 7.92 |
| 8 | 1 | methanol | 18 | 380–400 | 2.95 | 0.37 | 23 | top to bottom | 97.05% | 4070.4 | 3.175 | 7.92 |
| 9 | 1 | hexane | 18 | 390 | 2.52 | 0.33 | 23 | top to bottom | 96.54% | 3555.84 | 3.175 | 7.92 |
| 10 | 2 | acetone | 18 | 390 | 2.75 | 0.35 | 23 | top to bottom | 98.29% | 3800.32 | 3.175 | 7.92 |
| 11 | 1 | acetone | 18 | 400 | 1.82 | 0.23 | 23 | top to bottom | 97.48% | 2517.76 | 3.175 | 7.92 |
| 12 | 1 | acetone/recirc. | 18 | 400 | 2.64 | 0.33 | 23 | top to bottom | 97.77% | 3637.76 | 3.175 | 7.92 |
| 13 | 1 | acetone | 18 | 380 | 5.34 | 0.67 | 23 | top to bottom | 96.88% | 7372.8 | 3.175 | 7.92 |
| 14 | 1 | acetone/recirc. | 18 | 390 | | 1.03 | 23 | top to bottom | 92.32% | 11212.8 | 3.175 | 7 92 |
| 15 | 1 | acetone/recirc. | 18 | 310–390 | | 0.31 | 23 | top to bottom | 98.94% | 3366.4 | 3.175 | 7.92 |
| 16 | 1 | acetone/recirc. | 18 | 380–400 | | 0.52 | 23 | top to bottom | 98.59% | 5672.96 | 3.175 | 7.92 |
| 17 | 1 | acetone/recirc. | 18 | 360–400 | | 0.34 | 23 | top to bottom | 97.91% | 3750.4 | 3.175 | 7.92 |
| 18 | NAPA | none | 18 | 400 | 2.55 | 0.32 | 23 | top to bottom | 98.10% | 3517.44 | 3.175 | 7.92 |
| 19 | NAPA | acetone/methanol | 18 | 300 | 2.15 | 0.27 | 23 | top to bottom | 98.18% | 2963.2 | 3.175 | 7.92 |
| 20 | NAPA | hexane | 18 | 300 | 2.46 | 0.31 | 23 | top to bottom | 99.66% | 3399.68 | 3.175 | 7.92 |
| 21 | 1 | acetone/timed | 18 | 380–390 | | 0.30 | 23 | top to bottom | 96.01% | 3284.48 | 3.175 | 7.92 |
| 22 | 1 | acetone/recirc. | 18 | 390 | | 0.00 | 11 | top to bottom | 97.89% | 0 | 3.175 | 7.92 |
| 23 | 1 | 5W-30 oil | 18 | 380 | 5.25 | 0.65 | 23 | top to bottom | 95.95% | 7116.8 | 3.175 | 7.92 |
| 24 | 1 | ethanol | 18 | 360 | 5.45 | 0.69 | 23 | top to bottom | 96.90% | 7526.4 | 3.175 | 7.92 |
| 25 | Dia 1 | none | 18 | 400 | 2.6 | 0.33 | 23 | top to bottom | 99.39% | 3589.12 | 3.175 | 7.92 |
| 26 | Dia 1 | acetone | 18 | 390 | 2.36 | 0.30 | 23 | top to bottom | 99.99% | 3249.92 | 3.175 | 7.92 |
| 27 | Dia 2 | none | 18 | 390 | 2.48 | 0.31 | 23 | top to bottom | 97.97% | 3421.44 | 3.175 | 7.92 |
| 28 | Dia 2 | acetone | 18 | 390 | 6.4 | 0.81 | 23 | top to bottom | 98.93% | 8832 | 3.175 | 7.92 |
| 29 | Dia 3 | none | 18 | 390 | 6.4 | 0.81 | 23 | top to bottom | 99.53% | 8832 | 3.175 | 7.92 |
| 30 | Dia 4 | hexane | 18 | 400 | 2.58 | 0.33 | 23 | top to bottom | 99.90% | 3560.96 | 3.175 | 7.92 |

Remaining Propane Runs

The remaining propane runs, unless otherwise noted, had a total residence time of 23.0 minutes. Also, all of the runs were performed at ambient temperature, which was about 18–20° C. The pressure at which these runs were performed ranged from approximately 200–500 PSIG. The hydrocarbon removal percentage was obtained from hexane soxhlet extractions on the processed material. Hexane soxhlet extractions, i.e., using mixed hexanes as a solvent, will remove essentially all of the hydrocarbons from the clay sorbent material. The hexanes were refluxed for 4 hours during each soxhlet extraction.

The parameters for these runs are found in Table 6. The Napa waste material was a Napa Premium™ granular sorbent with 39.7% by weight used motor oil. Dia 1 waste material was a diatomaceous earth floor absorbant with 25.7% by weight used motor oil. Dia 2 waste material was a diatomaceous earth floor absorbant with 19.75% by weight used motor oil, 1.23% gear grease, 1.23% sulfur based oil, 1.23% hydrolic oil, 1.23% water soluble oil, and 1.23% antifreeze. Dia 3 waste material was a diatomaceous earth floor absorbant with 18.5% by weight used motor oil, and 3.2% extra heavy duty gear grease. Dia 4 waste material was a diatomaceous earth floor absorbant with 20% by weight used motor oil and 5% hydraulic oil.

Propane Cleaning—Comparison of Velocities

Figure 7:
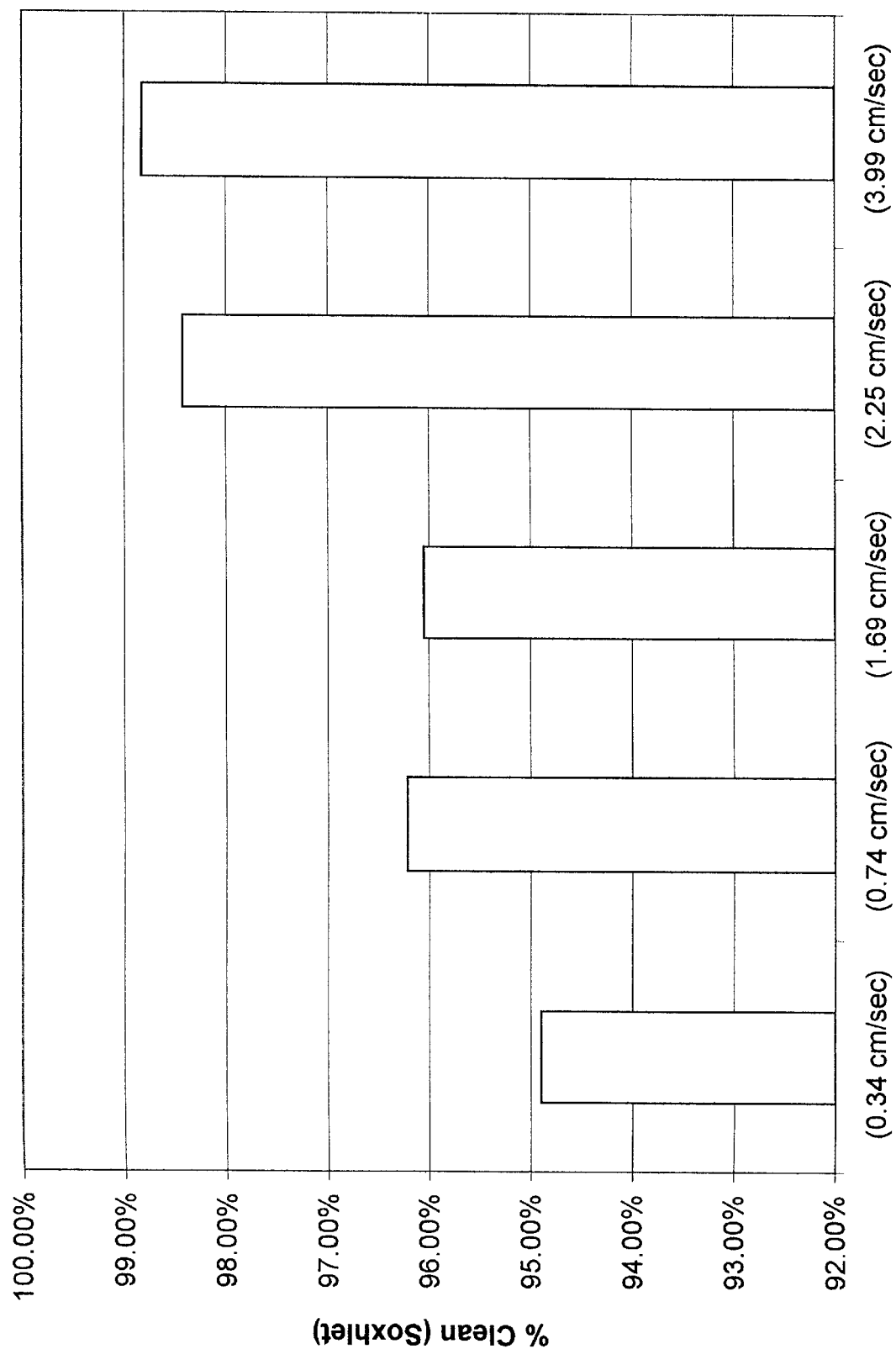
FIG. 7 is a graph comparing the percent clean for five separate runs at different solvent velocities (in the extraction vessel).

These results were obtained using waste sample 1. Referring to FIG. 7, an increased propane velocity increased the level of hydrocarbon removal from the clay sorbent material in a given time period.

Propane Cleaning—Comparison of Propane vs. Propane/Acetone Runs

Figure 8:
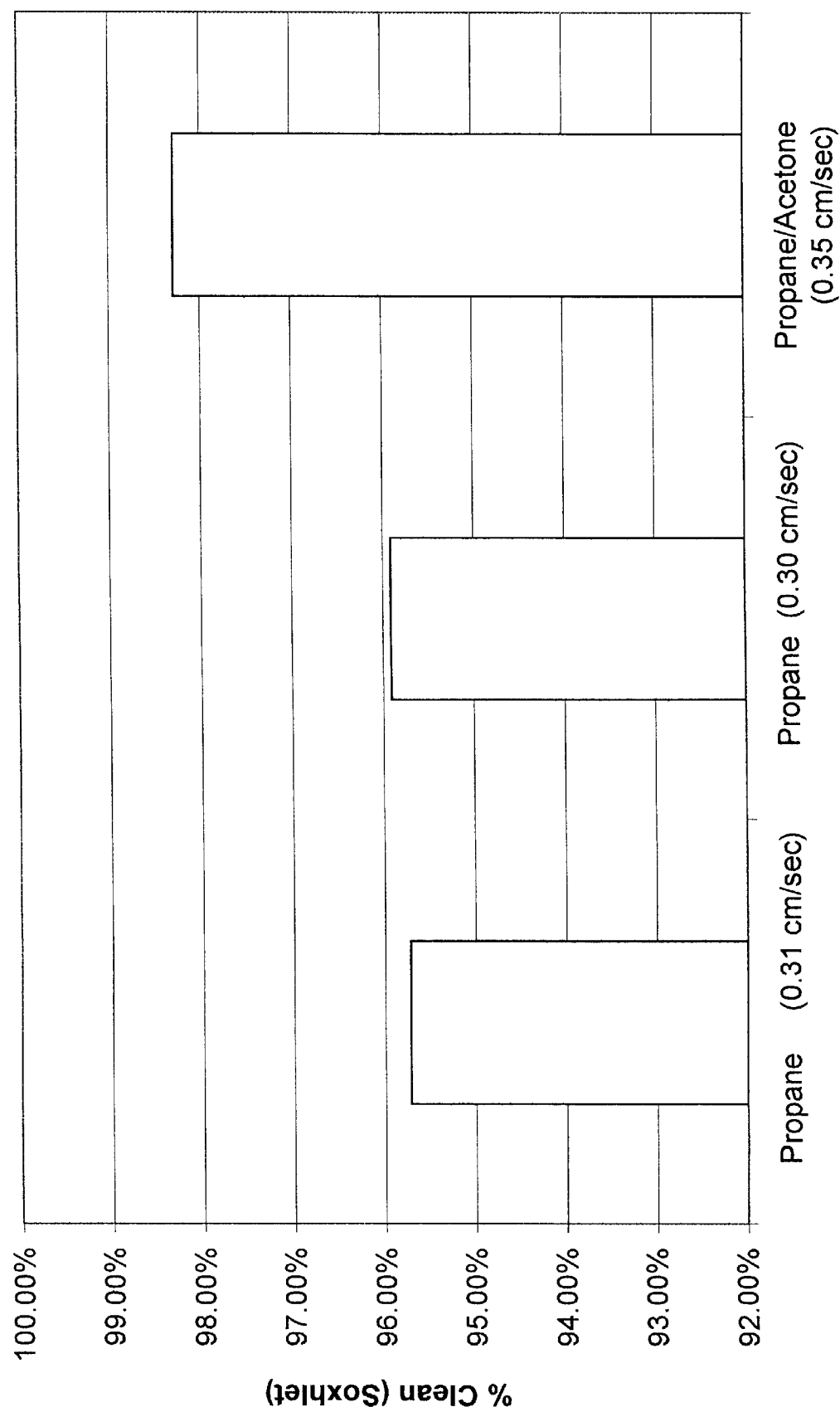
FIG. 8 is a graph comparing the percent clean for three separate runs holding the residence time and solvent velocity (in the extraction vessel) relatively constant and adding a cosolvent to one of the runs.
Figure 9:
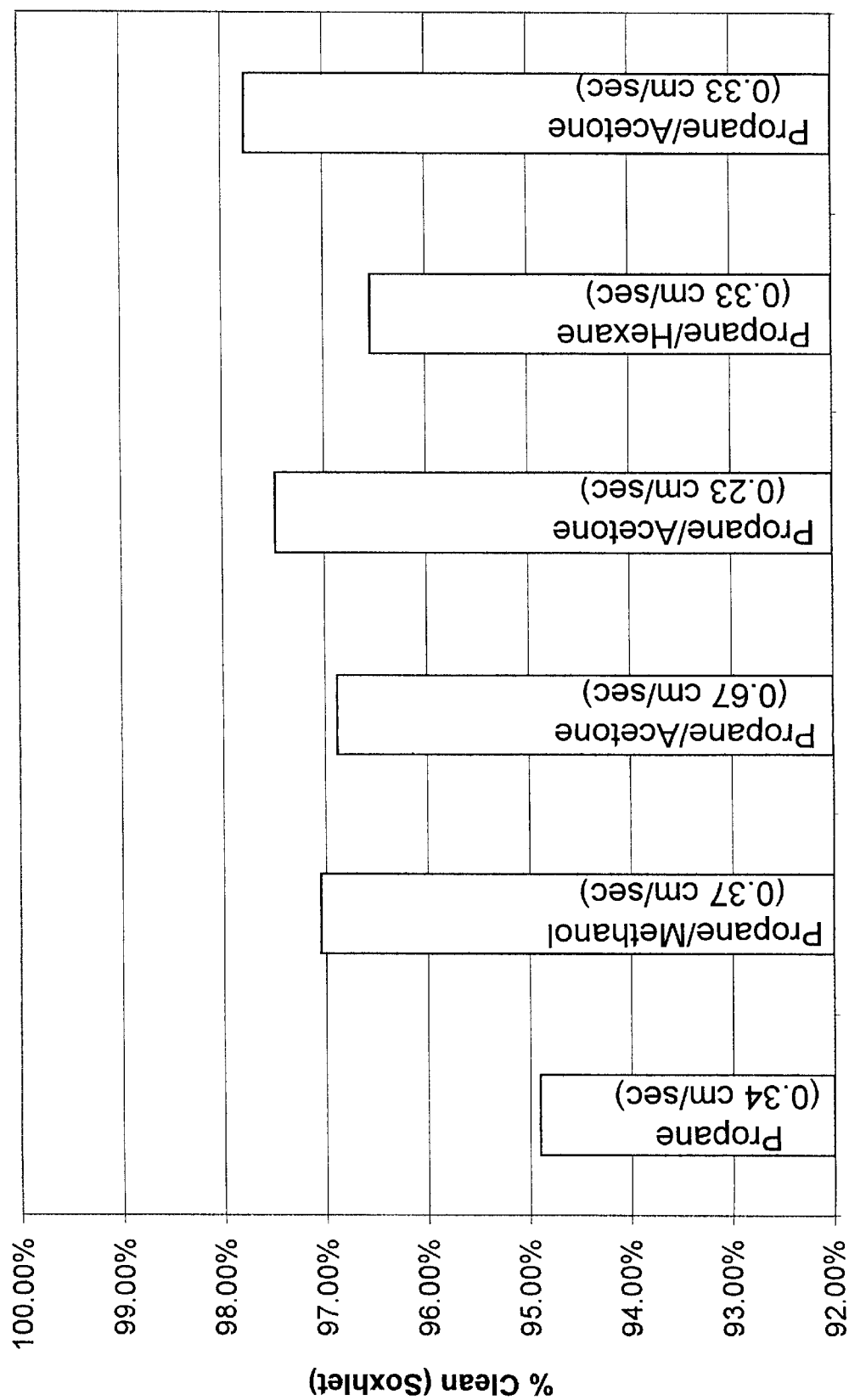
FIG. 9 is a graph comparing the percent clean for 6 separate recirculation runs with different solvent/cosolvent runs (in the extraction vessel) while varying solvent/cosolvent velocity. Three of the runs involve acetone as a cosolvent with varying solvent velocity.

These results were obtained with waste sample 2. Referring to FIG. 8, the acetone cosolvent aids in the removal of the hydrocarbons from the clay sorbent. These samples were all run with a linear velocity of approximately 0.3 cm/sec. which correlates to approximately 180 ml/min. when using the extraction vessel 3. To introduce the cosolvent, 100 ml of cosolvent was slowly added starting at 5 minutes into the run and after 6½ minutes (11½ minutes into the cycle) all of the cosolvent had been added. This would be approximately 15.4 ml/minute of cosolvent added to the 180 ml/min. of propane.

$$\text{Cosolvent ratio } \frac{15.4 \text{ ml acetone/min}}{180 \text{ ml/min.} + 15.4 \text{ ml/min.})} = 7.9\% \text{ acetone}$$

This addition of cosolvent substantially increased the total hydrocarbon removal from the clay sorbent.

Propane Cleaning—Comparison of Propane vs. Propane/Cosolvent Runs

These results were obtained with waste sample 1. The addition of cosolvent(s) increased the removal of the hydrocarbons. Acetone gave the best performance as far as percent removal of hydrocarbons. Once again, a total of 100 mls of cosolvent was used. The cosolvent was fed in over a period of 5–7 minutes with the propane flow maintained at approximately 180 ml/min.

It should also be noted that some of the cosolvents were used in runs with higher velocities of propane which correlates to an increased propane volume. These results were not any better than those that were run at lower velocities. In the higher velocity runs the same amount (100 ml) of cosolvent was used over approximately the same period of time (5–7 minutes). A higher propane velocity results in a lower percentage of cosolvent because of the increased volume of propane. In fact, some of the lower velocity runs show a slightly better performance than the higher velocity runs with the acetone cosolvent.

Propane Cleaning—Comparison of Propane/Acetone Recirculation Runs

Waste sample 1 was used to obtain these results. In these runs, propane alone was first run through the extractor for 5–9 minutes. The propane flow was then stopped, the cosolvent was then added, and the solvents (propane & acetone) were then re-circulated for 5 to 10 minutes. Propane alone was then run through the extractor vessel for an additional 5–10 minutes. Again the total run time was 23 minutes.

Figure 10:
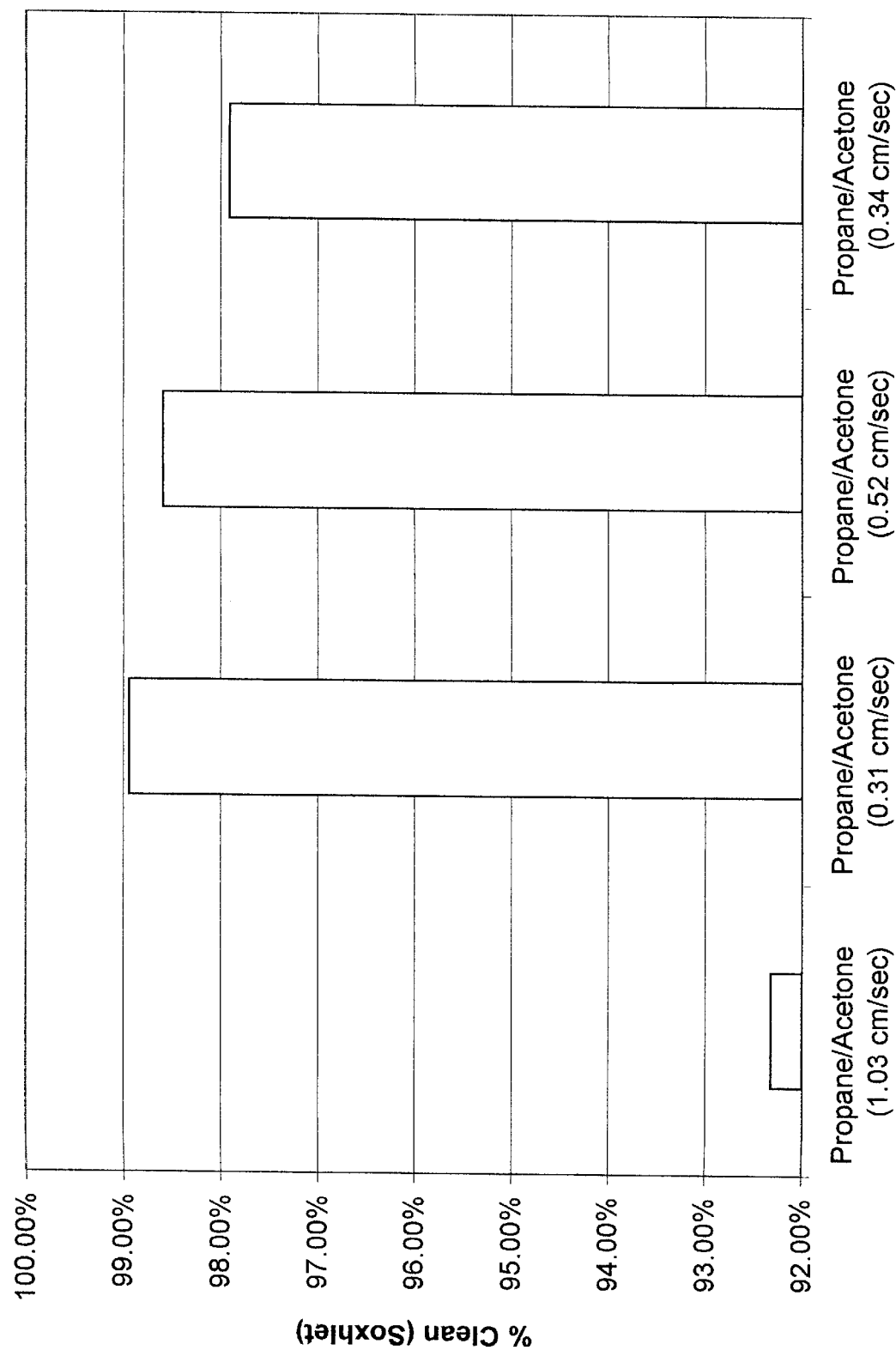
FIG. 10 is a graph comparing the percent clean for four separate runs using acetone as the cosolvent and recirculating the system. The solvent/cosolvent velocity was varied in these runs.

Referring to FIG. 10, the results indicated that the propane/acetone solvent mixture was not saturated with hydrocarbons. Rather, more efficient cleaning was obtained with lower velocities.

Propane Cleaning of Diatomaceous Earth Contaminated with Used Oil—Comparison of Propane vs. ProTane/Cosolvent(s)

Figure 12:
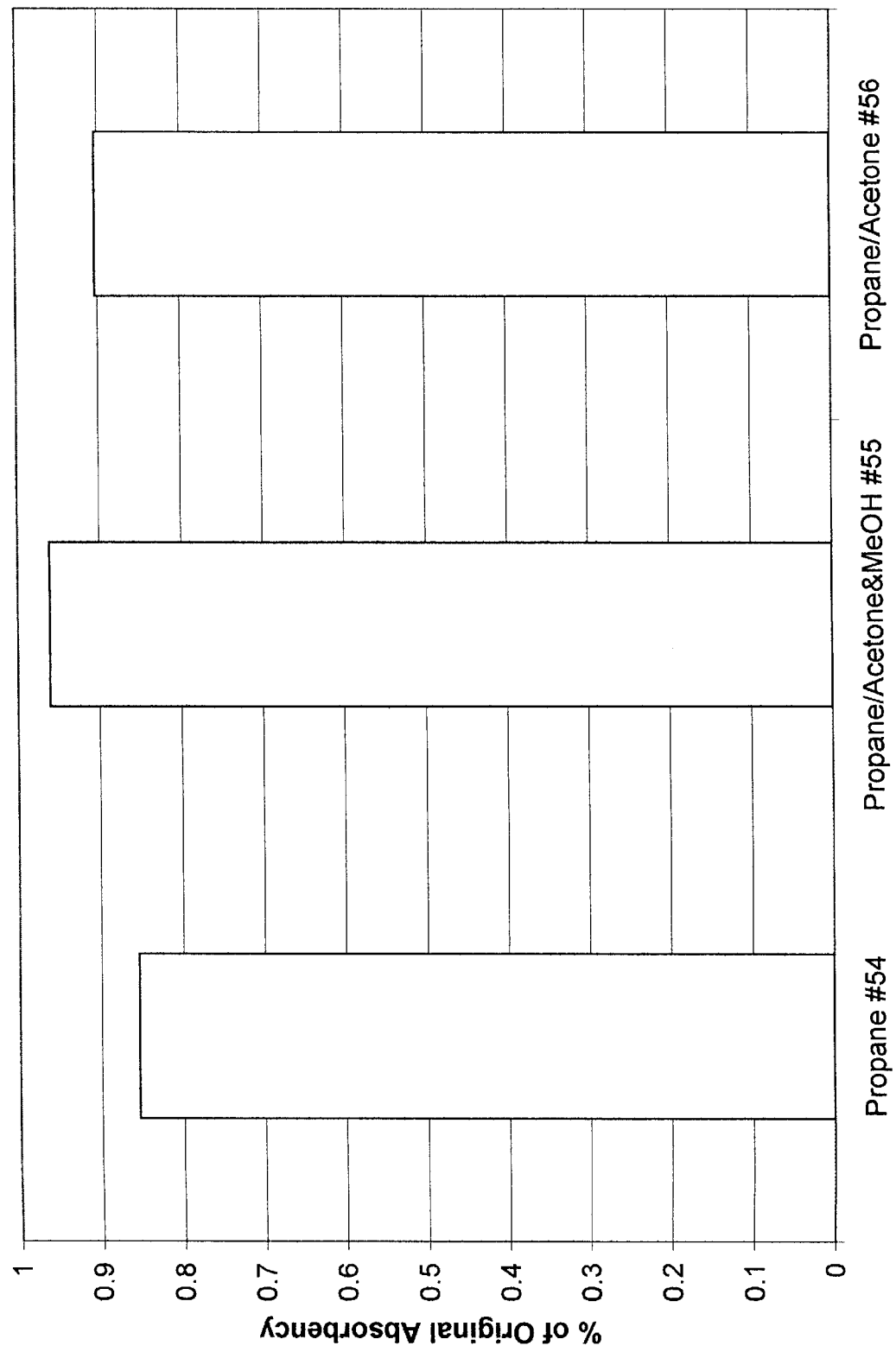
FIG. 12 is a graph comparing the absorbency of cleaned diatomaceous sorbent material of different runs.

These results were obtained with waste sample 3. The diatomaceous sorbent is more porous than the fullers earth material. Diatomaceous earth is also less dense and more absorbent on a per weight basis. The diatomaceous sorbent generally costs more per pound but is also more efficient in absorbing used oils. Referring to FIG. 12, diatomaceous earth is easier to clean within the given residence time of 23 minutes than fullers earth.

It should be noted also that the non-polar cosolvent (hexanes) did a better job of helping remove the hydrocarbons. This could be due to the fact that only used oil was used as the contaminate. Also, analysis of the processed material is performed with a hexanes Soxhlet extraction, which may provide a small bias in favor of a hexane cosolvent.

Figure 11:
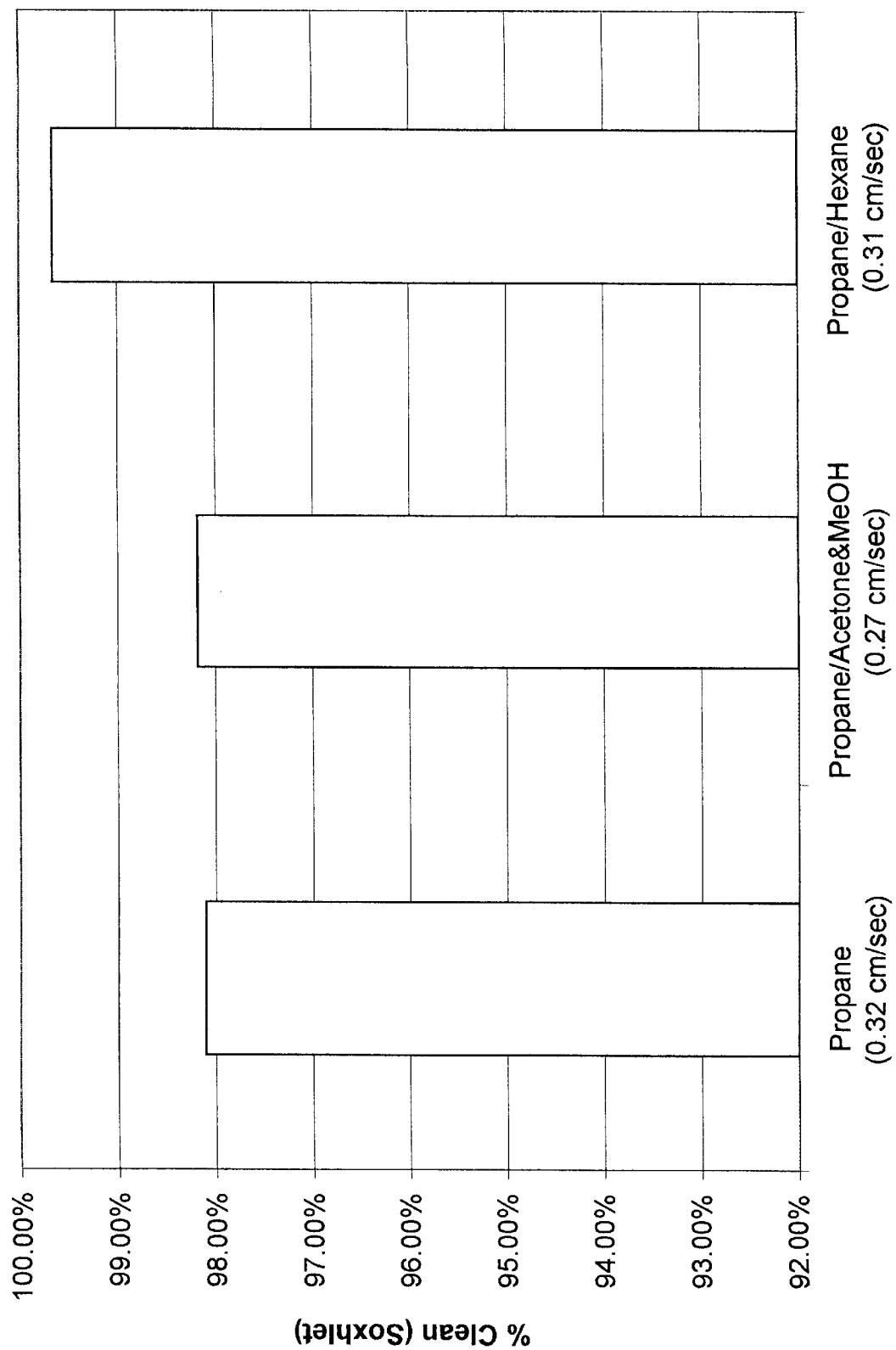
FIG. 11 is a graph comparing the percent clean of diatomaceous earth contaminated with used motor oil for three separate runs with similar solvent/cosolvent velocities (in the extraction vessel). Different cosolvents were used in two of the runs.

The three processed samples in FIG. 11 were tested for their oil absorption capacity. The oil used in all of the absorbency tests was new 5W-30 Amoco Ultimate Gold®. A virgin sample of diatomaceous sorbent was also tested for its absorbency capacity using the same test procedure.

Oil absorption was evaluated using 40 or 50 grams of sorbent, depending on the absorbency of the product. The oil is placed in a tube with a screen on one end to hold the sorbent. A 100 ml quantity of oil is placed in the tube. The tube is rotated to ensure that all of the material is wet. After all the solvent is wet, the excess oil is allowed to drain for three hours into a graduated cylinder. The absorption in ml/g is calculated based on the absorbed volume of oil.

Referring to FIG. 12, the absorbency capacity of the processed material is depicted as a percentage of the absorbency capacity of the virgin material. The absorbency capacity of the processed material ranges from approximately 85% to 90% of its original virgin absorbency capacity. The best absorbency capacity did not correlate to the process run which removed the most hydrocarbons. This may be due to the fact that the polar cosolvent is removing more of the polar components that may have a greater effect on the porosity of the sorbent material than the non-polar compounds. The virgin material had an adsorbancy ranging of about 1.05 ml oil per gram sorbent.

Propane with Cosolvent Acetone—Residence Times

These results were obtained with waste sample 1. The cosolvent was started at approximately 4.0 minutes. After approximately 9.0 minutes into the run (a total of 5.0 minutes of cosolvent addition), all of the cosolvent had been added.

Figure 13:
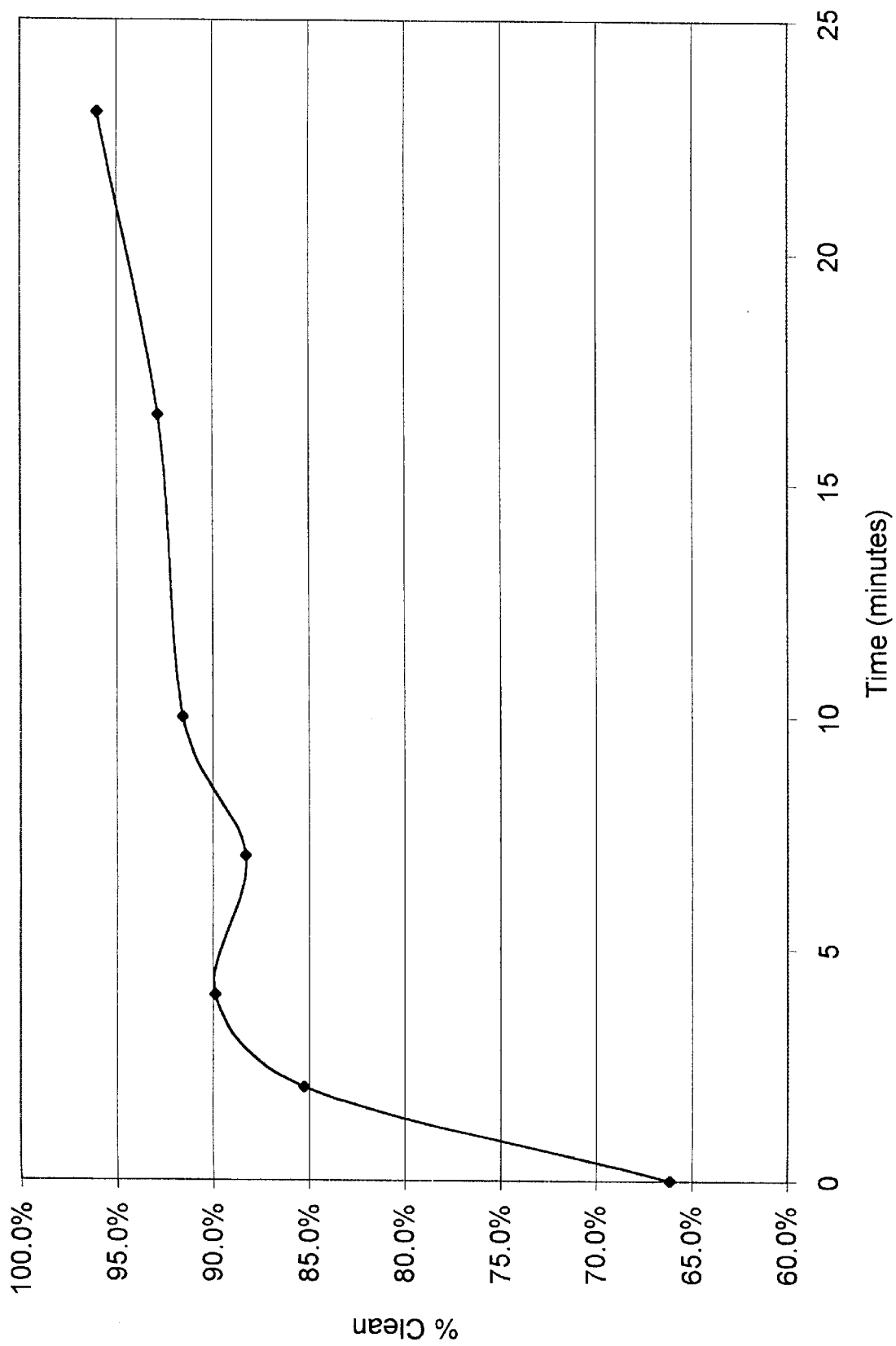
FIG. 13 is a graph comparing percent clean over time for an individual run.

Referring to FIG. 13, there is an increase in weight at 7 minutes into the run due to the cosolvent that is being added. It is important to add the cosolvent early in the run so that propane alone can flow for 5–10 minutes after all of the cosolvent has been added. This will ensure the removal of all of the cosolvent from the sorbent material.

Summary of Carbon Dioxide and Propane Results

The experimental results revealed the extraction of oils and greases from the granular sorbent material can be readily accomplished with either supercritical carbon dioxide or liquefied propane. The treated solids generally were darker than the virgin material, but were not visually oily and had only a slight petroleum odor.

The solubility of the oils in liquefied propane was greater than in supercritical carbon dioxide, approximately 15% in propane vs. 1% in carbon dioxide. Therefore, less extractor capacity would be necessary in a commercial propane plant than a carbon dioxide plant to achieve the same level of production. A commercial propane plant would also operate at significantly lower pressures than a carbon dioxide based plant and could utilize less expensive materials of construction. However, since propane is extremely flammable, a commercial propane plant would require additional safety engineering including explosion proof equipment and facilities, a flare system, a combustible gas detection system, and adherence to stringent building and safety codes. It should be noted that at the conditions of the tests, propane was in a liquefied state, far below its critical point of 617 PSIG and 206° F.

There was only a slight difference if any in the appearance of the cleaned material from the top of the vessel to the bottom of the vessel. The change in flow direction did effect the appearance of the cleaned material slightly when cosolvents were used. The flow direction did not make a detectable difference in the runs where cosolvents were not used. The use of cosolvents slightly improved the overall appearance of the cleaned material.

There was no significant channeling of the cleaning solvent observed on the runs. As stated earlier, the preferred granular sorbents have physical characteristics that provide for efficient cleaning with this process.

Although the invention has been described in detail for the purpose of illustrating the method and apparatus for cleaning granular sorbent material, it is to be understood that such detail is solely for the purpose of describing the preferred embodiment, and variations can be made herein by those skilled in the art without departing from the spirit and scope of the invention.

Example 3

Comparison of Dimethyl Ether and Propane Solvents

These Experiments were performed with apparatus 2. Total flow was measured starting after the vessel had been filled with solvent and pressurized at the operating pressure. The operating pressure was typically 200 PSIG for dimethyl ether. The sorbent materials were (runs 1, 2, 7, 8) Oil-Dri™ (Oil-Dri Corporation of America, Ill.), (runs 3, 4, 9, 10), Floor-Dry™, (Eagle Picher Minerals, Reno, Nevada), or (runs 5, 6, 11, 12) Napa Premium Oil Absorbant™ (Moltan Company, Memphis, Tenn.). The sorbant materials had oil absorbancies of 0.72 ml/g (Oil-Dri), 1.30 ml/g (Floor-Dry) and 0.96 ml/g (Napa).

The sorbent materials were either contaminated with used motor oil (runs 1–6), which was Amoco Ultimate Gold™ taken from a car after about 3000–5000 miles of driving, or a mixture of used motor oil, antifreeze and water (runs 7–12). The sorbent-oil mixture contained 47.01% oil and 52.99% sorbent. The contaminent mixture contained 64.90% used oil, 19.20% antifreeze and 15.90% water to form a final mixture that contained 57.22% sorbent and 42.88% contaminent.

The odd numbered runs were performed with propane solvent, and the even numbered runs were performed with dimethyl ether solvent. These runs had solvent residence times of 10 min. The results are summarized in Table 7. Dimethyl ether (DME) was significantly better at removing the used motor oil/glycol/water contaminants than the propane solvent for all three sorbent materials.

In every instance, the DME did a better job of removing the contaminants from the absorbents when compared to the propane. The re-absorbency of the processed material was also measured. In 2 out of 3 cases, the absorbents which were contaminated with the used oil and cleaned with the DME had better re-absorbancy than they did when they were processed with the propane. In the processed absorbents which were initially contaminated with used oil, antifreeze and water, in every case the material which was processed with DME was cleaned better and had higher re-absorbencies than those which were processed with propane. In fact, all of the samples which were processed with DME that were contaminated with used oil, antifreeze and water cleaned better and had higher re-absorbencies than those that were contaminated with just used oil and processed with DME.

TABLE 7

| Run # | Temp. (° C.) | Pressure (PSI) | Average Solvent Flow (ml/sec) | Average Linear Vel. (cm/sec) | % Clean Soxhlet | % Re-Absorbency | Total Flow (ml) |
|---|---|---|---|---|---|---|---|
| 1 | 20–23 | 300 | 2.06 | 0.26 | 94.18 | 66.7 | 1233 |
| 2 | 20–23 | 220 | 1.93 | 0.24 | 96.81 | 66.7 | 1159 |
| 3 | 20–23 | 300 | 2.12 | 0.27 | 97.66 | 93.1 | 1270 |
| 4 | 20–23 | 220 | 1.79 | 0.23 | 98.41 | 100.0 | 1073 |
| 5 | 20–23 | 300 | 2.19 | 0.28 | 89.27 | 63.5 | 1312 |
| 6 | 20–23 | 220 | 2.12 | 0.27 | 91.76 | 58.3 | 1270 |
| 7 | 20–23 | 300 | 2.23 | 0.28 | 92.13 | 48.6 | 1340 |
| 8 | 20–23 | 220 | 1.84 | 0.23 | 97.83 | 79.2 | 1103 |
| 9 | 20–23 | 300 | 2.41 | 0.30 | 97.83 | 72.3 | 1444 |
| 10 | 20–23 | 220 | 2.05 | 0.26 | 99.67 | 95.4 | 1231 |
| 11 | 20–23 | 300 | 2.36 | 0.30 | 82.90 | 52.1 | 1413 |
| 12 | 20–23 | 220 | 1.62 | 0.20 | 92.44 | 75.0 | 973 |

Example 4

Propane Solvent with Surfactants or Cosolvents

This example presents results obtained using propane solvent with a cosolvent or a surfactant. These runs were performed with apparatus 2. The pressure for these runs was 300 psi at a temperature ranging from about 20–23 degrees. The results are presented in Table 8.

TABLE 8

| Run # | Cosolvent or Surfactant | Average Solvent Flow (ml/sec) | Average Linear Vel. (cm/sec) | Residence Time (Min) | Total Flow (ml) |
|---|---|---|---|---|---|
| 1 |  | 3.38 | 0.43 | 23 | 4663 |
| 2 | 1 butanol | 3.29 | 0.42 | 23 | 4541 |
| 3 | 2-(2-ethoxy ethoxy)ethanol | 2.97 | 0.38 | 23 | 4101 |
| 4 | Hexanol | 2.59 | 0.33 | 23 | 3581 |
| 5 | didodecyl dimethyl ammonium bromide | 3.39 | 0.43 | 23 | 4675 |
| 6 | didodecyl dimethyl ammonium bromide | 2.84 | 0.36 | 23 | 3919 |
| 7 | Pluronic L-31 ™ | 2.15 | 0.27 | 23 | 2973 |
| 8 | Pluronic L-61 ™ | 1.90 | 0.24 | 23 | 2627 |
| 9 | Nuvite/0.5M HCL | 1.30 | 0.14 | 10 |  |
| 10 | Nuvite/ETOH & H2O | 1.58 | 0.20 | 10 | 948 |

Pluronic L-31 = polyoxypropylene-polyethylene block copolymer from BASF Corp. Mt. Olive, NJ.
Pluronic L-61 = polyoxyethylene-polyoxyproplene glycol from BASF Corp., Mt. Olive, NJ.

Example 5

Recontamination and Reprocessing

In this example, results are presented demonstrating that the processing can be performed repeatedly without significant degradation of the sorbent materials. The waste material was diatomaceous earth contaminated with used motor oil the amount of used motor oil added in each iteration of the process is presented in Table 9. The material was cleaned with propane solvent. The processing parameters are presented in Table 9. Following five cycles, the sorbent material had an absorbency of 0.96 ml/g compared with 1.30 ml/g for the virgin material. Thus, after five contamination and cleaning cycles, the material had an absorbency that was 74 percent of the virgin material. From a hexane soxhlet extraction, the material was shown to be about 93.37% clean.

TABLE 9

| Contamination and Cleaning Cycle | % Diatomaceous Earth | % Used Motor Oil 5W-50 | Residence Time (minutes) | Total Flow of Propane (ml) | Average Linear Velocity (cm/sec) |
| --- | --- | --- | --- | --- | --- |
| 1st | 58.71% | 41.29% | 23 | 4437 | 0.34 |
| 2nd | 50.26% | 49.74% | 23 | 4860 | 0.38 |
| 3rd | 49.98% | 50.02% | 23 | 4648 | 0.36 |
| 4th | 48.81% | 51.19% | 23 | 4890 | 0.38 |
| 5th | 53.55% | 46.45% | 23 | 4444 | 0.34 |

Example 6

Mats and Pads

This example presents results demonstrating the applicability of the cleaning method to the reclamation of sorbent mats and pads.

A Bortex™ traffic mat (100% virgin polypropylene needle punch product from 3M Company, Saint Paul, Minn.) was contaminated with 64.91% used motor oil, 19.24% antifreeze and 15.84% water. The mat had about 12.5% contaminants. First, the mat was processes using apparatus 2 with dimethyl ether solvent at 220 psi pressure and 20–23° C. temperature. The average solvent flow was 1.76 ml/sec producing an average linear velocity of 0.22 cm/sec. The solvent residence time was 10 min resulting in a total flow of solvent of 1056 ml. The resulting %clean (Soxhlet) was 98.95%.

While dimethyl ether solvent removed most of the oil, antifreeze and water, the mat still looked rather dirty due to residuals left on the mat. To explore the removal of these residuals, the mat cleaned with dimethyl ether was divided into four 2-inch by 2-inch squares. The square sections of mat then were cleaned using butane with or without added surfactant. The surfactant was DRY-SOL-HD™ from Nuvite Chemical Compounds Corp., New York, N.Y. The main component of the surfactant was butyl cellusolve. The surfactant was added to butane in a glass jar. The butane/surfactant mixture was cloudy, suggesting that an emulsion and/or reverse micelles had formed.

The sections of mat following the DME cleaning were placed in a glass jar holding butane with or without surfactant. The mats were soaked in the jar for 15 minutes. Two samples were further subjected to ultrasonics while soaking. After 15 minutes the mats were removed from the jars and allowed to dry. The cleaning results are summarized in Table 10. The mat that was cleaned with butane and surfactant along with ultrasonics had by far the best appearance. These results suggest that clean mats and pads could be obtained under pressure with either propane or dimethyl ether solvents if appropriately selected surfactants are used along with ultrasonics or megasonics.

TABLE 10

| Sample | Weight of Jar and Cap (g) | Weight of Mat (g) | Weight of Nuvite surfactant added (g) | Weight of Butane added (g) | Ultrasonic Cleaning (yes or no) | Weight of mat after cleaning (g) |
| --- | --- | --- | --- | --- | --- | --- |
| Virgin Mat |  | 1.921 | None | None | No | No cleaning |
| Corner 1 | 156.84 | 2.142 | None | 69.24 | Yes | 2.094 |
| Corner 2 | 155.09 | 1.974 | 0.120 | 78.68 | Yes | 1.932 |
| Corner 3 | 155.19 | 2.022 | 0.117 | 70.03 | No | 1.989 |
| Corner 4 | 156.89 | 2.035 | None | None | No | No cleaning |

Example 7

Pilot Plant Runs

The experimental apparatus consisted of the following: An 8-foot long by 3-inch diameter extractor where contact was made between the clay and the solvent. An air driven Haskel pump was used to deliver the solvent to the extractor. A separator consisting of a 5-gallon vessel equipped with heating coils (hot water source) in the bottom was used to vaporize the liquefied gas solvent from the extract for recycling. A double pipe heat exchanger directly downstream of the separator condensed the solvent vapor that flowed to a 3-gallon surge vessel that supplied the Haskel pump. The process had continuous solvent flow through a batch of contaminated clay.

A batch of spent clay absorbent (approximately 5 kilograms) containing 20–30% oil was loaded into the extractor. Solvent was then pumped through the extractor, entering through the top and exiting from the bottom. Flow rate, residence time, and solvent type were variables that were evaluated. Solvents included propane and dimethyl ether, as well as dimethyl ether that contained extracted oil. (It was thought that the dissolved oil in the solvent might act as a co-solvent, enhancing the solvating properties of the pure solvent.)

Several runs were completed with liquefied propane as the solvent. Operating pressure was about 300 PSIG and operating temperature ranged between 60° F. and 90° F. Flow rates ranged from 400 ml/min to 1200 ml/min, and cycle times ranged from 10 to 30 minutes. Extraction efficiencies with propane exceeded 95%. Efficiencies exceeded 97% when residence time exceeded 20 minutes or flow rates were at 1200 ml/min. (These results are based on a Soxhlet extraction analysis using hexane as the solvent). The treated solids from these tests visually appeared to be oil-free but were darker in color as compared to the virgin material.

Several additional runs were completed using liquefied dimethyl ether as the solvent. Operating pressure was held between 200–300 PSIG, and operating temperature ranged between 45° F. and 80° F. As with the propane runs, flow rates ranged from 400 ml/min to 1200 ml/min and cycle times ranged from 10 to 20 minutes. Extraction efficiencies for these tests were higher at 97–99.8%. These efficiencies were independent of the operating conditions tested, over the set of conditions which were evaluated. The treated solids obtained from these runs also appeared oil-free, and were lighter in color (closer to the virgin material) when compared to the propane runs.

One major objective of the study was to determine if a pressure drop across the bed of solids would be observed. Pressure drop was evaluated as a function of solvent type and solvent flow rate. Regardless of the parameters tested, no measurable pressure drop was observed. Zero pressure drop was observed for an extraction using propane at 1200 ml/min. An extraction using dimethyl ether showed zero pressure drop at 1200 ml/min. To further substantiate this observation, in one experiment, the clay absorbent was crushed to a much finer particle size and processed as described above. If a pressure drop would be evident, it would be more pronounced as particle size decreased. As with the other experiments, no measurable pressure drop was observed.

These experiments as well as previous bench scale experiments showed that oil was extracted from the solids relatively easily with either solvent. Due to this fact, a problem was observed in the pilot experiments with oil plugging needle valves during the initial minutes of extraction. The heavy oil being extracted would significantly increase the viscosity of the extract restricting flow through the needle valve. The solvent would then flash, freezing the oil in the needle valve resulting in a plugged valve. In order to minimize this occurrence, an extract dilution tank was added to the commercial design. The purpose of this tank was to provide an added volume where the heavy oils being extracted could mix with dilute solvent before entering equipment where plugging could potentially occur (i.e., filters).

For one run, samples of treated solids were obtained from the bottom, middle and top of the column. Visually, the sample representing the top of the column was darker than the samples representing the middle and bottom. Soxhlet extraction of these three fractions showed negligible difference in oil content; each fraction contained less than 0.2% residual oil. It was thought that oil being extracted from the solids at the top of the column was providing a co-solvent effect, enhancing the solvating property of the solvent as it continued down the column. The combination of solvent and extracted oil was believed to be removing the components responsible for imparting the dark color to the treated solids.

Three additional runs were designed to evaluate this effect. In these experiments, extracted oil dissolved in dimethyl ether was used as the solvent during the first part of the extraction cycle, then the extraction cycle was completed with pure dimethyl ether. The treated solids from the top of the column were no longer darker in color when compared to fractions obtained from the middle and bottom. Based on the pilot data, it was believed that inserting this step into the commercial design, the treated solids would be cleaner and the process would be more economical to build and operate.

The particular embodiments described above are intended to be exemplary and not limiting. Additional embodiments are within the scope of the claims below.

What is claimed is:

1. A method of removing contaminants from a contaminated sorbent granular mineral material, said sorbant granular mineral material in virgin form having a contaminant absorbency within the structure of the granular particles of at least about 25 percent by weight of said virgin sorbent granular mineral material, said method comprising:

contacting said contaminated sorbent granular mineral material in a pressure chamber with a pressurized solvent to form a solvent/contaminant mixture and cleaned sorbent granular mineral material, said solvent consisting essentially of a liquefied or supercritical form of ammonia, hydrocarbons or hydrocarbon substituted with functional groups including halogen atoms, oxygen atoms or nitrogen atoms, the solvent being a gas at standard temperature and pressure; and removing said cleaned sorbent granular mineral material from the pressurized chamber, wherein said cleaned sorbent granular mineral material has at least about 70 percent by weight of said contaminants removed; and distilling said solvent/contaminant mixture to recover at least a portion of said solvent.

2. The method of claim 1 wherein said sorbent granular mineral material in virgin form has an absorbency greater than about 45 percent by weight of said virgin sorbent material.

3. The method of claim 1 wherein granules of said sorbent granular mineral material has an average diameter from about 0.1 mm to about 2 cm.

4. The method of claim 1 further comprising agitating said solvent in said pressurized chamber.

5. The method of claim 4 wherein said agitation is performed by an approach selected from the group consisting of bubbling gas through said pressure chamber, propelling a mechanical agitator, and applying sonic energy.

6. The method of claim 1 wherein said sorbent granular mineral material comprises a material selected from the group consisting of ball clay, common clay, shale, fire clay, Fuller's earth, kaolin, diatomaceous earth, and montmorillonite.

7. The method of claim 1 wherein said cleaned sorbent granular mineral material has an absorptive capacity of at least about 50 percent by volume relative to the corresponding virgin sorbent granular mineral material.

8. The method of claim 1 wherein said cleaned sorbent granular mineral material has at least 85 percent by weight of said contaminants removed.

9. The method of claim 1 wherein said contaminants comprise lubricants, petroleum oils, machine oils, dielectric oils, silicone oils, reflux residues, adhesive residues, plasticizers, fatty materials, waxy materials, or combinations thereof.

10. The method of claim 1 wherein said solvent comprises a liquified form of propane, isobutane, butane, or dimethyl ether.

11. The method of claim 1 wherein said solvent further comprises a surfactant.

* * * * *